US011900005B2

(12) United States Patent
Noh et al.

(10) Patent No.: US 11,900,005 B2
(45) Date of Patent: Feb. 13, 2024

(54) VIDEO WALL

(71) Applicant: LG ELECTRONICS INC., Seoul (KR)

(72) Inventors: Hyunchul Noh, Seoul (KR); Jeonghyu Yang, Seoul (KR); Yunjun Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 124 days.

(21) Appl. No.: 17/438,219

(22) PCT Filed: Mar. 13, 2020

(86) PCT No.: PCT/KR2020/003537
§ 371 (c)(1),
(2) Date: Sep. 10, 2021

(87) PCT Pub. No.: WO2020/185035
PCT Pub. Date: Sep. 17, 2020

(65) Prior Publication Data
US 2022/0179611 A1    Jun. 9, 2022

(30) Foreign Application Priority Data
Mar. 13, 2019  (KR) .................. 10-2019-0028900

(51) Int. Cl.
*G06F 3/14* (2006.01)
*G09G 3/3208* (2016.01)

(52) U.S. Cl.
CPC ......... *G06F 3/1446* (2013.01); *G09G 3/3208* (2013.01); *G09G 2300/026* (2013.01);
(Continued)

(58) Field of Classification Search
CPC ............... G06F 3/1446; G09G 3/3208; G09G 2300/026; G09G 2320/0257;
(Continued)

(56) References Cited

U.S. PATENT DOCUMENTS

| 2010/0053336 A1* | 3/2010 | Bourret | ................ H04N 17/004 |
| | | | 348/180 |
| 2011/0013048 A1* | 1/2011 | Wei | ........................ H04N 23/71 |
| | | | 348/E9.053 |

(Continued)

FOREIGN PATENT DOCUMENTS

| JP | 2015-200806 A | 11/2015 |
| KR | 10-2007-0093284 A | 9/2007 |

(Continued)

*Primary Examiner* — Amare Mengistu
*Assistant Examiner* — Gloryvid Figueroa-Gibson
(74) *Attorney, Agent, or Firm* — Birch, Stewart, Kolasch & Birch, LLP

(57) ABSTRACT

The present disclosure relates to a video wall. The video wall according to an embodiment of the present disclosure comprises: a plurality of displays; an image divider configured to divide an input image into a plurality of images; and at least one controller, wherein in response to a video being repeatedly played back, the at least one controller is configured to calculate an accumulated luminance value for each block on the plurality of displays during a first period when the video is repeatedly played back and calculate a luminance compensation value for each block based on the calculated accumulated luminance, and the plurality of displays display the video based on the luminance compensation value during a second period following the first period. Accordingly, an afterimage occurring due to the repeatedly played video may be reduced.

18 Claims, 29 Drawing Sheets

(52) U.S. Cl.
CPC ............... *G09G 2320/0257* (2013.01); *G09G 2320/045* (2013.01); *G09G 2320/046* (2013.01); *G09G 2320/103* (2013.01); *G09G 2360/145* (2013.01); *G09G 2360/16* (2013.01)

(58) Field of Classification Search
CPC ....... G09G 2320/045; G09G 2320/046; G09G 2320/103; G09G 2360/145; G09G 2360/16
USPC .......................................................... 348/383
See application file for complete search history.

(56) References Cited

U.S. PATENT DOCUMENTS

| | | |
|---|---|---|
| 2011/0216084 A1 | 9/2011 | Mori et al. |
| 2015/0103108 A1* | 4/2015 | Seong .................. G09G 3/3208 |
| | | 345/694 |
| 2018/0052651 A1 | 2/2018 | Son et al. |
| 2018/0137839 A1* | 5/2018 | Kang .................... G06F 3/1446 |
| 2018/0182285 A1 | 8/2018 | Wang |
| 2021/0142745 A1* | 5/2021 | Kimura .................... G09G 3/20 |

FOREIGN PATENT DOCUMENTS

| | | |
|---|---|---|
| KR | 10-2009-0126316 A | 12/2009 |
| KR | 10-2017-0088462 A | 8/2017 |
| KR | 10-2018-0055541 A | 5/2018 |

* cited by examiner

FIG. 9B

| conv | = | conv | bn | relu | | | |
|---|---|---|---|---|---|---|---|
| conv fc | = | conv dw | bn | relu | conv pw | bn | relu |
| fc | = | fc | bn | relu | | | |

FIG. 10A
(a)
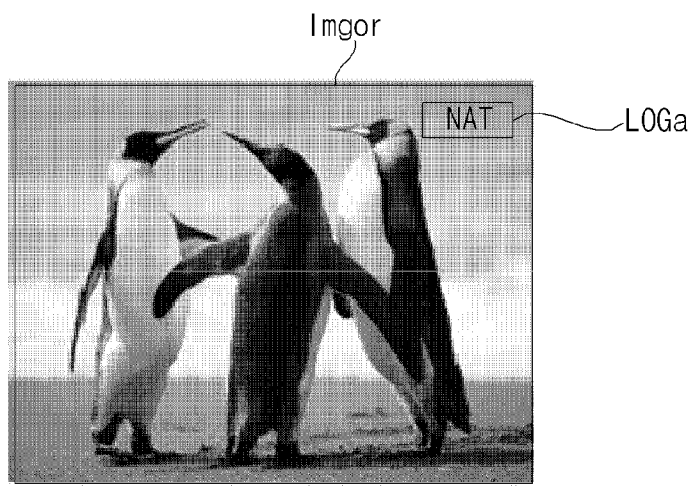
(b)
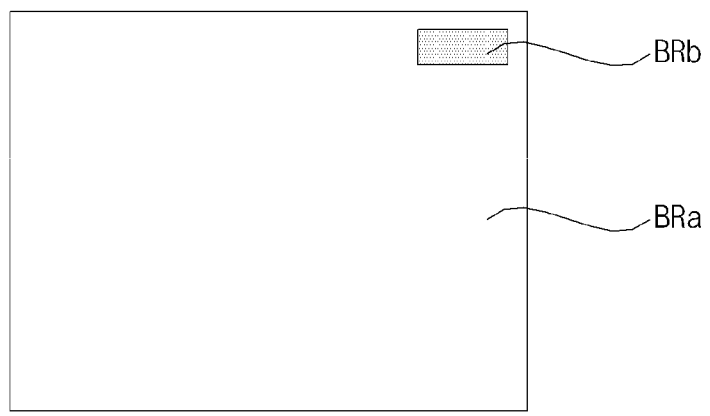

VIDEO WALL

CROSS REFERENCE TO RELATED APPLICATIONS

This application is the National Phase of PCT International Application No. PCT/KR2020/003537, filed on Mar. 13, 2020, which claims priority under 35 U.S.C. 119(a) to Patent Application No. 10-2019-0028900, filed in the Republic of Korea on Mar. 13, 2019, all of which are hereby expressly incorporated by reference into the present application.

BACKGROUND OF THE INVENTION

1. Field of the Invention

The present disclosure relates to a video wall, and more particularly to a video wall capable of reducing an afterimage which occurs due to a repeatedly played video.

2. Description of the Related Art

A video wall, including a plurality of displays, is an image display device.

Generally, commercial video walls are used on the inside or outside of buildings for advertising purposes and the like.

Meanwhile, the displays used in the video wall may be of various types such as a liquid crystal display panel, organic light-emitting diode panel, and the like.

Meanwhile, in the case where the video wall comprises organic light-emitting diode panels, there may be a problem in that a burn-in phenomenon or an afterimage occurs due to an organic light-emitting material of each organic light-emitting diode panel.

SUMMARY OF THE INVENTION

It is an object of the present disclosure to provide a video wall capable of reducing an afterimage which occurs due to a repeatedly played video.

It is yet another object of the present disclosure to provide a video wall having a plurality of displays, in which a lifespan of the video wall may be extended.

In accordance with an aspect of the present disclosure, the above and other objects can be accomplished by providing a video wall including: a plurality of displays arranged adjacent to each other; an image divider configured to divide an input image into a plurality of images for displaying on the plurality of displays; and at least one controller configured to control a plurality of image display apparatuses corresponding to the plurality of displays, wherein in response to a video displayed on the plurality of image display apparatuses being repeatedly played back, the at least one controller is configured to calculate an accumulated luminance value for each block on the plurality of displays during a first period when the video is repeatedly played back and calculate a luminance compensation value for each block based on the calculated accumulated luminance value for each block, and the plurality of displays display the video based on the luminance compensation value for each block during a second period following the first period when the video is repeatedly played back.

Meanwhile, among the plurality of image display apparatuses, a controller of a first image display apparatus may determine whether the video displayed on the plurality of image display apparatuses is repeatedly played back, and in response to the video displayed on the plurality of image display apparatuses being repeatedly played back, the controller may calculate an accumulated luminance value for each block on the plurality of displays and may calculate a luminance compensation value for each block based on the calculated accumulated luminance value for each block, and based on the luminance compensation value for each block, the controller may display the video during a second period following the first period when the video is repeatedly played back.

Meanwhile, among the plurality of image display apparatuses, the controller of the first image display apparatus may determine whether the video displayed on the plurality of image display apparatuses is repeatedly played back.

Meanwhile, in response to the video displayed on the plurality of image display apparatuses being repeatedly played back, controllers of the respective image display apparatuses may calculate an accumulated luminance value for each block on the plurality of displays and may calculate a luminance compensation value for each block based on the calculated accumulated luminance value for each block, and based on the luminance compensation value for each block, the controllers may display the video during a second period following the first period when the video is repeatedly played back.

Meanwhile, among the plurality of image display apparatuses, the controller of the first image display apparatus, during playback of the video, may extract eigenvalues of each frame and may determine whether a group including the extracted eigenvalues is repeated, and if the group is repeated, the controller may determine which the video is repeatedly played back.

Meanwhile, as the calculated accumulated luminance value for each block increases, the video wall according to an embodiment of the present disclosure may decrease a level of the luminance compensation value for each block.

Meanwhile, as a number of times of repeated playback of the video displayed on the plurality of image display apparatuses increases, the video wall according to an embodiment of the present disclosure may decrease the level of the luminance compensation value for each block.

Meanwhile, the plurality of displays according to an embodiment of the present disclosure may comprise an OLED panel, wherein a level of a luminance compensation value of a red sub-pixel of a first display, among the plurality of displays, may be preferably lower than a level of a luminance compensation value of a green sub-pixel.

Meanwhile, the plurality of displays according to an embodiment of the present disclosure may comprise an OLED panel, wherein in response to an accumulated luminance value of the red sub-pixel of the first display, among the plurality of displays, being equal to an accumulated luminance value of the green sub-pixel, the level of the luminance compensation value of the red sub-pixel may be preferably lower than the level of the luminance compensation value of the green sub-pixel.

Meanwhile, during the second period, the video wall according to an embodiment of the present disclosure may perform temporal filtering on the luminance compensation value for each block, and may display the video based on the filtered luminance compensation value for each block.

Meanwhile, the video wall according to an embodiment of the present disclosure may turn off the temporal filtering at a time of scene change while the video is repeatedly played back during the second period, and may display a scene change image based on the luminance compensation value for each block.

Meanwhile, while the video is played back, the video wall according to an embodiment of the present disclosure may display a video having a luminance value higher than the luminance compensation value for each block during a third period following the second period.

Meanwhile, among the plurality of image display apparatuses, the controller of the first image display apparatus may calculate a global gain based on the calculated accumulated luminance value for each block on the plurality of displays; and may transmit the global gain to the respective controllers corresponding to the plurality of displays.

Meanwhile, in response to the video displayed on the plurality of image display apparatuses being repeatedly played back, the video wall according to an embodiment of the present disclosure may calculate an accumulated luminance value for each block on the plurality of displays during a first period when the video is repeatedly played back, and may calculate a global gain based on the calculated accumulated luminance value for each block on the plurality of displays; and during a second period following the first period when the video is repeatedly played back, the video wall may display the video based on the luminance compensation value for each block and the global gain.

In accordance with another aspect of the present disclosure, the above and other objects can be accomplished by providing a video wall including: a plurality of displays arranged adjacent to each other; an image divider configured to divide an input image into a plurality of images for displaying on the plurality of displays; and at least one controller configured to control a plurality of image display apparatuses corresponding to the plurality of displays, wherein in response to a video displayed on the plurality of image display apparatuses being repeatedly played back, the video wall may calculate an accumulated luminance value for each block on the plurality of displays during a first period when the video is repeatedly played back and may calculate a global gain based on the calculated accumulated luminance value for each block, and based on the global gain, the video wall may display the video during a second period following the first period when the video is repeatedly played back.

Meanwhile, in response to the video displayed on the plurality of image display apparatuses being repeatedly played back, the video wall according to another embodiment of the present disclosure may calculate an accumulated luminance value for each block on the plurality of displays during a first period when the video is repeatedly played back, and may calculate a global gain based on the calculated accumulated luminance value for each block on the plurality of displays; and during a second period following the first period when the video is repeatedly played back, the video wall may display the video based on a luminance compensation value for each block and the global gain.

Meanwhile, among the plurality of image display apparatuses, a controller of a first image display apparatus may determine whether the video displayed on the plurality of image display apparatuses is repeatedly played back, and in response to the video displayed on the plurality of image display apparatuses being repeatedly played back, the controller of the first image display apparatus may calculate an accumulated luminance value for each block on the plurality of displays during the first period when the video is repeatedly played back and may calculate a global gain based on the calculated accumulated luminance value for each block, and based on the global gain, the controller may display the video during a second period following the first period when the video is repeatedly played back.

Meanwhile, among the plurality of image display apparatuses, the controller of the first image display apparatus may determine whether the video displayed on the plurality of image display apparatuses is repeatedly played back, wherein in response to the video displayed on the plurality of image display apparatuses being repeatedly played back, controllers of the respective image display apparatuses may calculate an accumulated luminance value for each block on the plurality of displays.

Meanwhile, among the plurality of image display apparatuses, the controller of the first image display apparatus may calculate a global gain based on the calculated accumulated luminance value for each block.

Meanwhile, in response to the video displayed on the plurality of image display apparatuses being repeatedly played back, the controllers of the respective image display apparatuses may control the video to be displayed during a second period following the first period based on the global gain.

Meanwhile, among the plurality of image display apparatuses, the controller of the first image display apparatus, during playback of the video, may extract eigenvalues of each frame and may determine whether a group including the extracted eigenvalues is repeated, and if the group is repeated, the controller may determine which the video is repeatedly played back.

Effects of the Invention

A video wall according to an embodiment of the present disclosure comprises: a plurality of displays arranged adjacent to each other; an image divider configured to divide an input image into a plurality of images for displaying on the plurality of displays; and at least one controller configured to control a plurality of image display apparatuses corresponding to the plurality of displays, wherein in response to a video displayed on the plurality of image display apparatuses being repeatedly played back, the at least one controller is configured to calculate an accumulated luminance value for each block on the plurality of displays during a first period when the video is repeatedly played back and calculate a luminance compensation value for each block based on the calculated accumulated luminance value for each block, and the plurality of displays display the video based on the luminance compensation value for each block during a second period following the first period when the video is repeatedly played back. Accordingly, an afterimage may be reduced on the video wall. Particularly, an afterimage may be reduced on the video wall, on which the video is repeatedly displayed.

Meanwhile, among the plurality of image display apparatuses, a controller of a first image display apparatus may determine whether the video displayed on the plurality of image display apparatuses is repeatedly played back, and in response to the video displayed on the plurality of image display apparatuses being repeatedly played back, the controller may calculate an accumulated luminance value for each block on the plurality of displays and may calculate a luminance compensation value for each block based on the calculated accumulated luminance value for each block, and based on the luminance compensation value for each block, the controller may display the video during a second period following the first period when the video is repeatedly played back. Accordingly, an afterimage may be reduced on the video wall, on which the video is repeatedly displayed.

Meanwhile, in response to the video displayed on the plurality of image display apparatuses being repeatedly played back, controllers of the respective image display apparatuses may calculate an accumulated luminance value for each block on the plurality of displays and may calculate a luminance compensation value for each block based on the calculated accumulated luminance value for each block, and based on the luminance compensation value for each block, the controllers may display the video during a second period following the first period when the video is repeatedly played back. Accordingly, an afterimage may be reduced on the video wall, on which the video is repeatedly displayed.

Meanwhile, among the plurality of image display apparatuses, the controller of the first image display apparatus, during playback of the video, may extract eigenvalues of each frame and may determine whether a group including the extracted eigenvalues is repeated, and if the group is repeated, the controller may determine which the video is repeatedly played back. Accordingly, it is possible to accurately determine whether the video is repeatedly played back.

Meanwhile, as the calculated accumulated luminance value for each block increases, the video wall according to an embodiment of the present disclosure may decrease a level of the luminance compensation value for each block. Accordingly, it is possible to efficiently reduce an afterimage on the video wall, on which the video is repeatedly displayed.

Meanwhile, as a number of times of repeated playback of the video displayed on the plurality of image display apparatuses increases, the video wall according to an embodiment of the present disclosure may decrease the level of the luminance compensation value for each block. Accordingly, it is possible to efficiently reduce an afterimage on the video wall, on which the video is repeatedly displayed.

Meanwhile, the plurality of displays according to an embodiment of the present disclosure may comprise an OLED panel, wherein a level of a luminance compensation value of a red sub-pixel of a first display, among the plurality of displays, may be preferably lower than a level of a luminance compensation value of a green sub-pixel. Accordingly, it is possible to maximize the effect of reducing an afterimage of the green sub-pixel having a shorter device lifespan.

Meanwhile, the plurality of displays according to an embodiment of the present disclosure may comprise an OLED panel, wherein in response to an accumulated luminance value of the red sub-pixel of the first display, among the plurality of displays, being equal to an accumulated luminance value of the green sub-pixel, the level of the luminance compensation value of the red sub-pixel may be preferably lower than the level of the luminance compensation value of the green sub-pixel. Accordingly, it is possible to maximize the effect of reducing an afterimage of the green sub-pixel having a shorter device lifespan.

Meanwhile, during the second period, the video wall according to an embodiment of the present disclosure may perform temporal filtering on the luminance compensation value for each block, and may display the video based on the filtered luminance compensation value for each block. Accordingly, smooth playback of the video may be achieved while reducing an afterimage on the video wall 10, on which the video is repeatedly displayed.

Meanwhile, the video wall according to an embodiment of the present disclosure may turn off the temporal filtering at a time of scene change while the video is repeatedly played back during the second period, and may display a scene change image based on the luminance compensation value for each block. Accordingly, during the scene change, it is possible to focus more on the effect of reducing an afterimage than on smooth playback of the video.

Meanwhile, while the video is played back, the video wall according to an embodiment of the present disclosure may display a video having a luminance value higher than the luminance compensation value for each block during a third period following the second period. Accordingly, it is possible to reduce an afterimage on the video wall, on which the video is repeatedly displayed.

Meanwhile, among the plurality of image display apparatuses, the controller of the first image display apparatus may calculate a global gain based on the calculated accumulated luminance value for each block on the plurality of displays; and may transmit the global gain to the respective controllers corresponding to the plurality of displays. Accordingly, it is possible to reduce an afterimage on the video wall, on which the video is repeatedly displayed.

Meanwhile, in response to the video displayed on the plurality of image display apparatuses being repeatedly played back, the video wall according to an embodiment of the present disclosure may calculate an accumulated luminance value for each block on the plurality of displays during a first period when the video is repeatedly played back, and may calculate a global gain based on the calculated accumulated luminance value for each block on the plurality of displays; and during a second period following the first period when the video is repeatedly played back, the video wall may display the video based on the luminance compensation value for each block and the global gain. Accordingly, it is possible to reduce an afterimage on the video wall, on which the video is repeatedly displayed.

Meanwhile, a video wall according to another embodiment of the present disclosure comprises: a plurality of displays arranged adjacent to each other; an image divider configured to divide an input image into a plurality of images for displaying on the plurality of displays; and at least one controller configured to control a plurality of image display apparatuses corresponding to the plurality of displays, wherein in response to a video displayed on the plurality of image display apparatuses being repeatedly played back, the video wall may calculate an accumulated luminance value for each block on the plurality of displays during a first period when the video is repeatedly played back and may calculate a global gain based on the calculated accumulated luminance value for each block, and based on the global gain, the video wall may display the video during a second period following the first period when the video is repeatedly played back. Accordingly, an afterimage may be reduced on the video wall. Particularly, an afterimage may be reduced on the video wall, on which the video is repeatedly displayed.

Meanwhile, in response to the video displayed on the plurality of image display apparatuses being repeatedly played back, the video wall according to another embodiment of the present disclosure may calculate an accumulated luminance value for each block on the plurality of displays during a first period when the video is repeatedly played back, and may calculate a global gain based on the calculated accumulated luminance value for each block on the plurality of displays; and during a second period following the first period when the video is repeatedly played back, the video wall may display the video based on a luminance compensation value for each block and the global gain. Accordingly, an afterimage may be reduced on the video wall, on which the video is repeatedly displayed.

Meanwhile, among the plurality of image display apparatuses, a controller of a first image display apparatus may determine whether the video displayed on the plurality of image display apparatuses is repeatedly played back, and in response to the video displayed on the plurality of image display apparatuses being repeatedly played back, the controller of the first image display apparatus may calculate an accumulated luminance value for each block on the plurality of displays during the first period when the video is repeatedly played back and may calculate a global gain based on the calculated accumulated luminance value for each block, and based on the global gain, the controller may display the video during a second period following the first period when the video is repeatedly played back. Accordingly, an afterimage may be reduced on the video wall, on which the video is repeatedly displayed.

BRIEF DESCRIPTION OF THE DRAWINGS

FIGS. 10A to 10C are diagrams referred to in the description of an afterimage on a video wall;

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
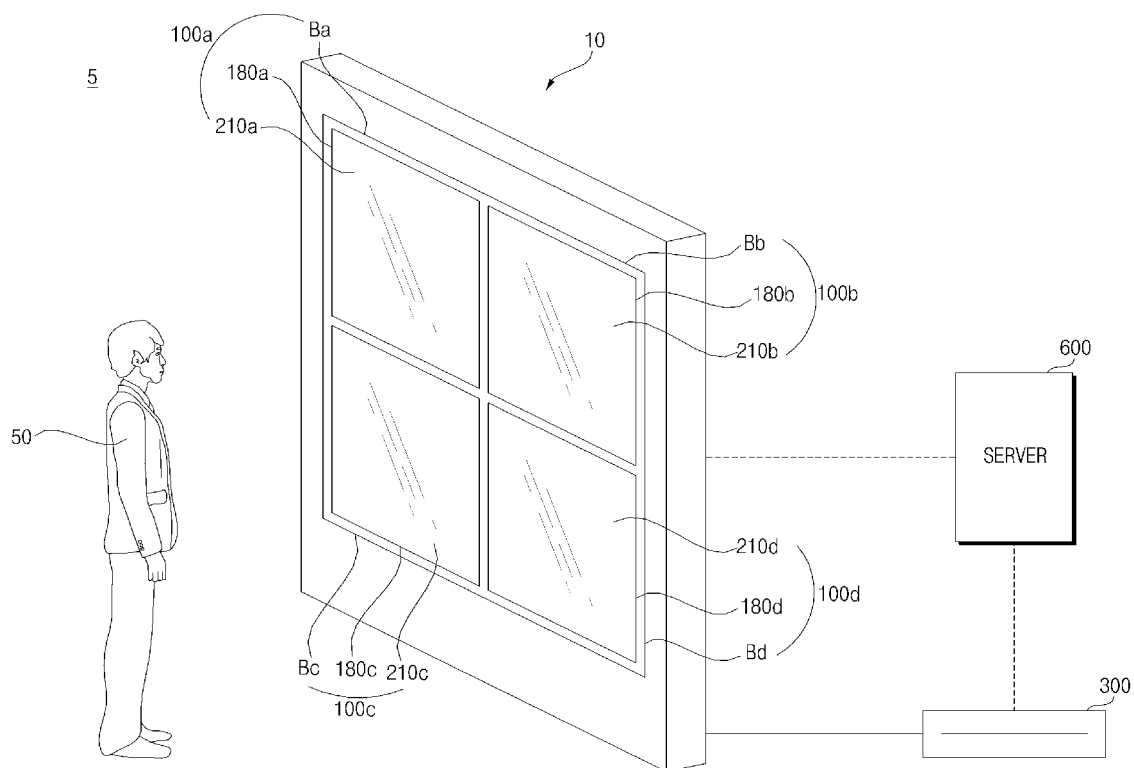
FIG. 1 is a diagram illustrating an image display system according to an embodiment of the present disclosure.

FIG. 1 is a diagram illustrating an image display system according to an embodiment of the present disclosure.

Referring to the drawing, the image display system 5 according to an embodiment of the present disclosure may include a video wall 10 including a plurality of image display apparatuses 100a to 100d, a set-top box 300, and a server 600.

The video wall 10 according to an embodiment of the present disclosure may receive images from the set-top box 300, the server 600, an internal memory, or the like.

For example, the video wall 10 may receive an image signal from the set-top box 300 through an HDMI terminal.

In another example, the video wall 10 may receive an image signal from the server 600 through a network terminal.

Meanwhile, the video wall 10 may be installed inside a building or may be installed outdoors in public places.

For example, the video wall 10 may be provided in public places, such as vehicles, bus terminals, railroad stations, airports, etc., in order to provide information such as advertisements, news and notices. In addition, the display apparatus may be provided near display windows of department stores, shopping malls or markets, for advertisements of specific products.

The video wall 10 may include a plurality of displays 180a to 180d arranged contiguously.

Meanwhile, a plurality of displays 180a to 180d may be implemented with any one of various panels. For example, the plurality of displays 180a to 180d may be any one of a liquid crystal display (LCD) panel, an organic light emitting diode (OLED) panel, an inorganic light emitting diode (LED) panel, and the like.

The following description will be made based on an example in which the plurality of displays 180a to 180d include the organic light emitting diode (OLED) panel.

Meanwhile, the organic light emitting diode (OLED) panel has advantages in that the OLED panel has a faster response speed than that of LCD, has an excellent color representation effect with high color representation qualities.

Meanwhile, the plurality of displays 180a to 180d may include a plurality of panels 210a to 210d and bezels Ba to Bd surrounding the panels 210a to 210d, respectively.

In the figure, the video wall 10 comprises a plurality of image display apparatuses 100a to 100d including the plurality of displays 180a to 180d. The plurality of image display apparatuses 100a to 100d may include a plurality of controllers 170a to 170d in addition to the plurality of displays 180a to 180d.

For example, in the video wall 10, images divided by an image divider 160 may be input to the controllers 170a to 170d respectively included in the plurality of image display apparatuses 100a to 100d, and the image signals respectively processed by the controllers 170a to 170d may be input to the displays 180a to 180d, and the displays 180a to 180d may display the images.

Accordingly, a viewer 50 can view the images displayed through the video wall 10 as shown in the figure. In particular, the viewer can view the images displayed on the plurality of displays 180a to 180d.

In another example, the video wall 10 may include one controller for commonly controlling the plurality of image display apparatuses 100a to 100d. Accordingly, the common controller may perform signal processing on the displayed image. Further, the processed images may be input to the displays 180a to 180d and the respective displays 180a to 180d may display the images.

Meanwhile, in the case where the plurality of displays 180*a* to 180*d* include the OLED panel, an afterimage may be caused by the burn-in phenomenon due to the characteristics of the OLED panel.

Particularly, if an image with high brightness is displayed continuously at the same position, a device lifespan at the corresponding position decreases.

The technology for preventing an afterimage caused by the burn-in phenomenon may include technology for making the entire display screen darker, or technology for detecting a corresponding area by detecting an area, such as a logo area, which is continuously displayed for an extended period of time.

However, the technologies have a drawback in that the technologies may not be applied to an afterimage occurring due to a repeatedly played video.

Accordingly, the present disclosure provides a method of reducing an afterimage occurring due to a repeatedly played video.

The video wall 10 according to an embodiment of the present disclosure comprises: a plurality of displays 180*a* to 180*d* arranged adjacent to each other; an image divider 160 configured to divide an input image into a plurality of images for displaying on the plurality of displays 180*a* to 180*d*; and at least one controller 170 for controlling the plurality of image display apparatuses 100*a* to 100*d* corresponding to the plurality of displays 180*a* to 180*d*, wherein if a video displayed on the plurality of image display apparatuses 100*a* to 100*d* is repeatedly played back, the controller is configured to calculate an accumulated luminance value for each block on the plurality of displays 180*a* to 180*d* during a first period when the video is repeatedly played back and calculate a luminance compensation value for each block based on the calculated accumulated luminance value for each block, and the controller displays the video based on the luminance compensation value for each block during a second period following the first period when the video is repeatedly played. Accordingly, an afterimage may be reduced on the video wall 10. Particularly, an afterimage may be reduced on the video wall 10, on which the video is repeatedly displayed.

Meanwhile, a controller 170*a* of the first image display apparatus 100*a* among the plurality of image display apparatuses 100*a* to 100*d* determines whether a video displayed on the plurality of image display apparatuses 100*a* to 100*d* is repeatedly played back, and in response to the video displayed on the plurality of image display apparatuses being repeatedly played back, the controller 170*a* may calculate an accumulated luminance value for each block on the plurality of displays 180*a* to 180*d* and calculate a luminance compensation value for each block based on the calculated accumulated luminance value for each block, and based on the luminance compensation value for each block, the controller 170*a* may control the video to be displayed during a second period following the first period when the video is repeatedly played back. Accordingly, an afterimage may be reduced on the video wall 10, on which the video is repeatedly displayed.

Meanwhile, if the video displayed on the plurality of image display apparatuses 100*a* to 100*d* is repeatedly played back, the respective controllers 170*a* to 170*d* of the plurality of image display apparatuses 100*a* to 100*d* may calculate an accumulated luminance value for each block on the plurality of displays 180*a* to 180*d* and calculate a luminance compensation value for each block based on the calculated accumulated luminance value for each block, and based on the luminance compensation value for each block, the respective controllers 170*a* to 170*d* may control the video to be displayed during a second period following the first period when the video is repeatedly played back. Accordingly, an afterimage may be reduced on the video wall 10, on which the video is repeatedly displayed.

Meanwhile, a video wall 10 according to another embodiment of the present disclosure comprises: a plurality of displays 180*a* to 180*d* arranged adjacent to each other; an image divider 160 configured to divide an input image into a plurality of images for displaying on the plurality of displays 180*a* to 180*d*; and at least one controller for controlling the plurality of image display apparatuses 100*a* to 100*d* corresponding to the plurality of displays 180*a* to 180*d*, wherein if a video displayed on the plurality of image display apparatuses 100*a* to 100*d* is repeatedly played back, the controller is configured to calculate an accumulated luminance value for each block on the plurality of displays 180*a* to 180*d* during a first period when the video is repeatedly played back and calculate a global gain based on the calculated accumulated luminance value for each block, and based on the global gain, the controller displays the video during a second period following the first period when the video is repeatedly played back. Accordingly, an afterimage may be reduced on the video wall 10. Particularly, an afterimage may be reduced on the video wall 10, on which the video is repeatedly displayed.

Meanwhile, an internal structure and operation of the video wall 10 and the like will be described in further detail with reference to FIGS. 2 and 3.

Figure 2:
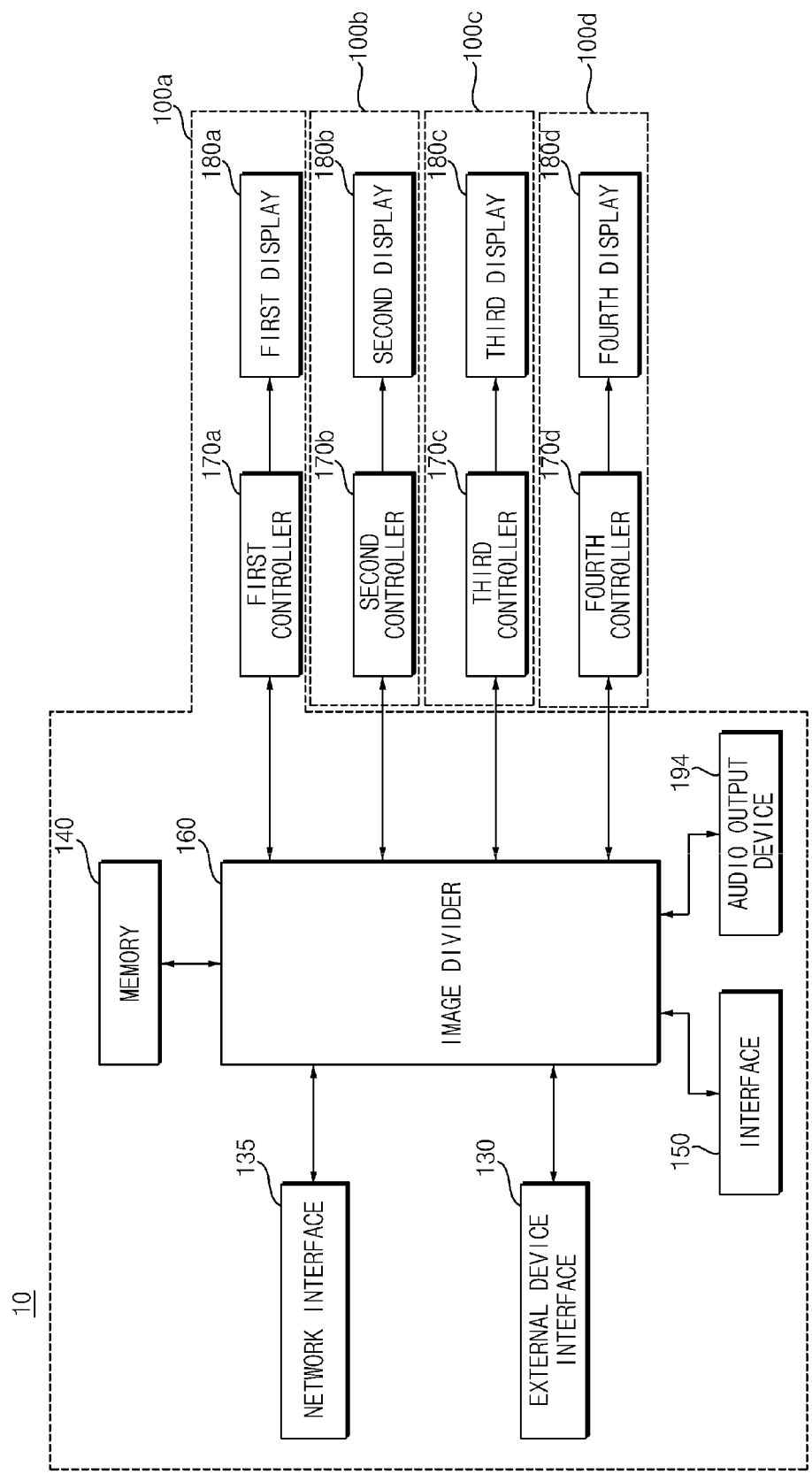
FIG. 2 is an example of an internal block diagram of a video wall of FIG. 1.

FIG. 2 is an example of an internal block diagram of a video wall of FIG. 1.

Referring to the drawing, the video wall 10 may include a first to fourth image display apparatuses 100*a* to 100*d*.

For convenience of explanation, it is illustrated in the drawing that the second to fourth image display apparatuses 100*b* to 100*d* have the second to fourth displays 180*b* to 180*d* or the second to fourth controllers 170*b* to 170*d*, respectively, but may include an external device interface, a network interface, a memory, an image divider, a power supply, an audio output device, etc., unlike the drawing.

Meanwhile, the first image display apparatus 100*a* may include an external device interface 130, a network interface 135, a memory 140, a user input interface 150, an image divider 160, a first controller 170*a*, a first display 180*a*, a power supply 190, an audio output device 194, and the like.

The external device interface 130 may serve to transmit or receive data to or from an external device (not shown) connected thereto. To this end, the external device interface 130 may include an A/V input/output (I/O) device (not shown) or a data input/output module (not shown).

For example, the external device interface 130 may include an HDMI port, an RGB port, a component port, a USB port, a micro SD port, etc.

The network interface 135 serves as an interface between the image display apparatus 100 and a wired/wireless network such as the Internet. For example, the network interface 135 may receive content or data provided by an Internet or content provider or a network operator over a network.

The memory 140 may store various programs necessary for the controller 170*a* to process and control signals, and may also store processed video, audio and data signals.

Further, the memory 140 may temporarily store a video, audio and/or data signal received from the external device interface 130.

Meanwhile, the plurality of displays 180*a* to 180*d* may be arranged adjacent to each other, may include various display panels such as LCDs, OLEDs, PDPs, etc., and may display predetermined images through the display panels.

The user input interface 150 transmits a signal input by the user to the controller 170 or transmits a signal received from the controller 170 to the user.

To this end, the user input interface 150 may include a local key including a power key, a touch panel for inputting user information, etc.

The image divider 160 may divide an input image stored in the memory 140 or an input image received from an external device through the external device interface 130 or the network interface 135 into a plurality of images, for displaying the input image through the plurality of displays 180a to 180d.

For example, the image divider 160 may crop the input image into a plurality of images and scale the images.

In particular, the image divider 160 may perform cropping and scaling in consideration of the resolution and size of the plurality of displays 180a to 180d.

Meanwhile, the image divider 160 may perform overall control of the video wall 10. More specifically, the image divider 160 may control operation of the respective devices of the video wall 10.

Meanwhile, at least one controller for controlling the plurality of displays 180a to 180d may be provided.

Meanwhile, it is illustrated in the drawing that the plurality of controllers 170a to 170d for controlling the plurality of displays 180a to 180d are provided corresponding to the number of displays 180a to 180d.

The plurality of controllers 170a to 170d may perform control operation for image display through the plurality of displays 180a to 180d.

Meanwhile, if a video displayed on the plurality of image display apparatuses 100a to 100d is repeatedly played back, the respective controllers 170a to 170d calculate an accumulated luminance value for each block on the plurality of displays 180a to 180d during a first period when the video is repeatedly played back and calculate a luminance compensation value for each block based on the calculated accumulated luminance value for each block, and based on the luminance compensation value for each block, the respective controllers 170a to 170d may display the video during a second period following the first period when the video is repeatedly played back. Accordingly, an afterimage may be reduced on the video wall 10, on which the video is repeatedly displayed.

Meanwhile, the controller 170a of the first image display apparatus 100a among the plurality of image display apparatuses 100a to 100d determines whether a video displayed on the plurality of image display apparatuses 100a to 100d is repeatedly played back, and in response to the video displayed on the plurality of image display apparatuses being repeatedly played back, the controller 170a calculates an accumulated luminance value for each block on the plurality of displays 180a to 180d and calculate a luminance compensation value for each block based on the calculated accumulated luminance value for each block, and based on the luminance compensation value for each block, the controller 170a may control the video to be displayed during a second period following the first period when the video is repeatedly played back. Accordingly, an afterimage may be reduced on the video wall 10, on which the video is repeatedly displayed.

Meanwhile, if a video displayed on the plurality of image display apparatuses 100a to 100d is repeatedly played back, the respective controllers 170a to 170d of the plurality of image display apparatuses 100a to 100d may calculate an accumulated luminance value for each block on the plurality of displays 180a to 180d and may calculate a luminance compensation value for each block based on the calculated accumulated luminance value for each block, and based on the luminance compensation value for each block, the respective controllers 170a to 170d may control the video to be displayed during a second period following the first period when the video is repeatedly played back. Accordingly, an afterimage may be reduced on the video wall 10, on which the video is repeatedly displayed.

Meanwhile, each of the plurality of controllers 7170a to 170d may control the plurality of displays 180a to 180d to output a predetermined image. More specifically, RGB signals corresponding to a video image to be displayed may be output through the plurality of displays 180a to 180d. Thus, the plurality of displays 180a to 180d may display respective images.

The power supply 190 may receive external or internal power and supply power necessary for operation of the components.

The power supply 190 supplies power to the image video wall 100 and, more particularly, the plurality of controllers 170a to 170d implemented in the form of a system on chip (SOC), the plurality of displays 180a to 180d for displaying video, and the audio output device 194 for outputting audio.

A temperature sensor (not shown) may sense the temperature of the video wall 10.

The temperature sensed by the temperature sensor (not shown) may be input to the plurality of controllers 170a to 170d or the image divider 160, which may control operation of a fan driver (not shown) in order to reduce internal heat based on the sensed temperature.

Figure 3:
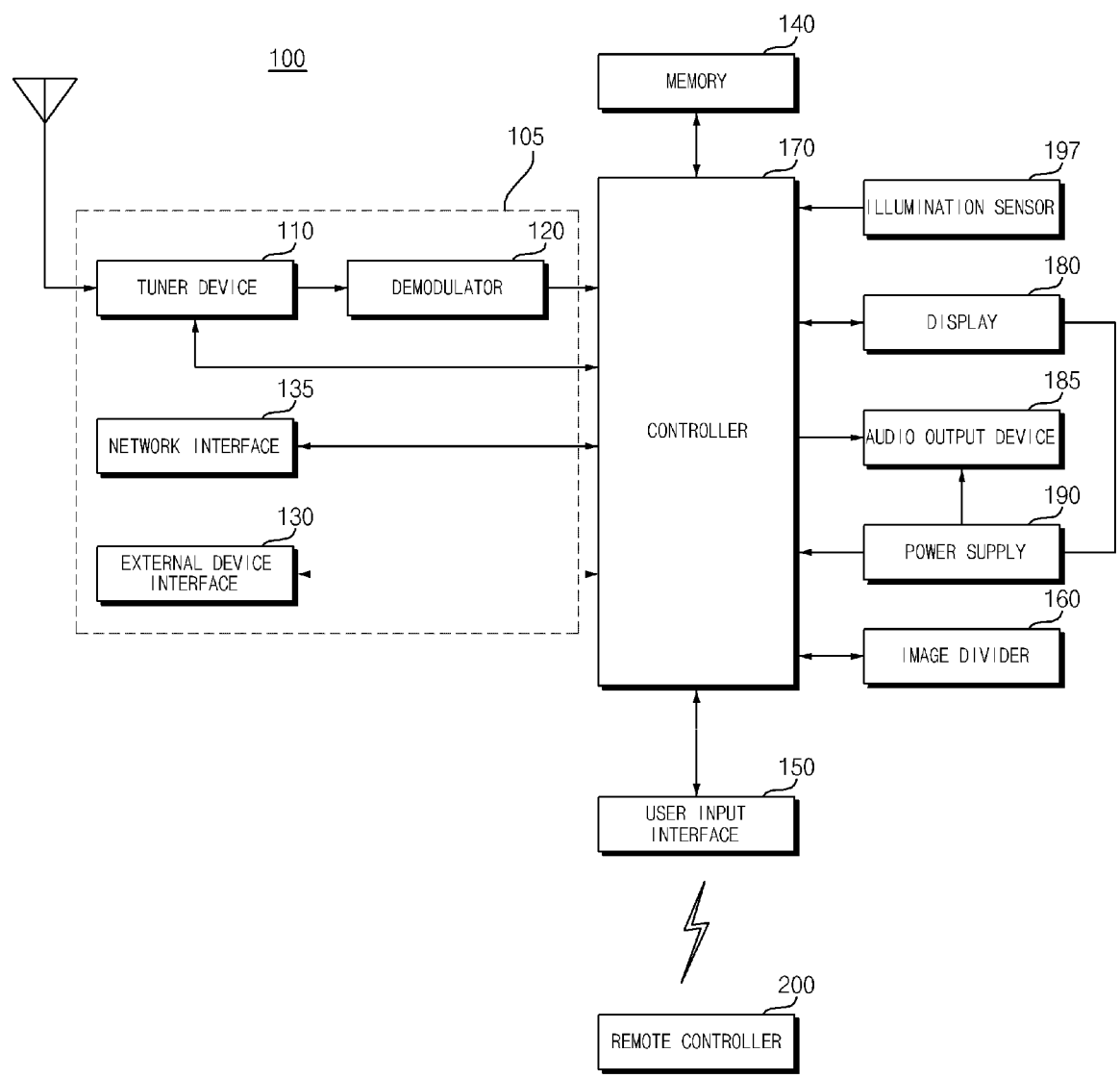
FIG. 3 is an example of an internal block diagram of an image display apparatus of FIG. 1.

FIG. 3 is an example of an internal block diagram of an image display apparatus of FIG. 1.

Referring to FIG. 3, the image display apparatus 100 according to an embodiment of the present disclosure comprises an image receiver 105, a memory 140, a user input interface 150, a sensor device (not shown), a controller 170, a display 180, and an audio output device 185.

The image receiver 105 may include a tuner device 110, a demodulator 120, a network interface 135, and an external device interface 130.

Meanwhile, unlike the drawing, the image receiver 105 may include only the tuner device 110, the demodulator 120, and the external device interface 130. That is, the network interface 135 may not be included.

The tuner device 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner device 110 can process a digital broadcast signal or an analog broadcast signal. The analog baseband image or audio signal (CVBS/SIF) output from the tuner device 110 may be directly input to the controller 170.

Meanwhile, the tuner device 110 can include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner device 110 and performs a demodulation operation.

The demodulator 120 may perform demodulation and channel decoding and then output a stream signal TS. At this time, the stream signal may be a demultiplexed signal of an image signal, an audio signal, or a data signal.

The stream signal output from the demodulator 120 may be input to the controller 170. The controller 170 performs demultiplexing, image/audio signal processing, and the like, and then outputs an image to the display 180 and outputs audio to the audio output device 185.

The external device interface 130 may transmit or receive data with a connected external apparatus (not shown), e.g., a set-top box 50. To this end, the external device interface 130 may include an A/V input and output device (not shown).

The external device interface 130 may be connected in wired or wirelessly to an external apparatus such as a digital versatile disk (DVD), a Blu ray, a game equipment, a camera, a camcorder, a computer (note book), and a set-top box, and may perform an input/output operation with an external apparatus.

The A/V input and output device may receive image and audio signals from an external apparatus. Meanwhile, a wireless communicator (not shown) may perform short-range wireless communication with other electronic apparatus.

Through the wireless communicator (not shown), the external device interface 130 may exchange data with an adjacent mobile terminal 600. In particular, in a mirroring mode, the external device interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless communicator (not shown).

The memory 140 may store a program for each signal processing and control in the controller 170, and may store a signal-processed image, audio, or data signal.

In addition, the memory 140 may serve to temporarily store image, audio, or data signal input to the external device interface 130. In addition, the memory 140 may store information on a certain broadcast channel through a channel memory function such as a channel map.

Although FIG. 3 illustrates that the memory 140 is provided separately from the controller 170, the scope of the present invention is not limited thereto. The memory 140 may be included in the controller 170.

The user input interface 150 transmits a signal input by the user to the controller 170 or transmits a signal from the controller 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the controller 170, may transfer a user input signal input from a sensor device (not shown) that senses a user's gesture to the controller 170, or may transmit a signal from the controller 170 to the sensor device (not shown).

The controller 170 may demultiplex the input stream through the tuner device 110, the demodulator 120, the network interface 135, or the external device interface 130, or process the demultiplexed signals to generate and output a signal for image or audio output.

For example, the controller 170 receives a broadcast signal received by the image receiver 105 or an HDMI signal, and perform signal processing based on the received broadcast signal or the HDMI signal to thereby output a signal-processed image signal.

The image signal processed by the controller 170 is input to the display 180, and may be displayed as an image corresponding to the image signal. In addition, the image signal processed by the controller 170 may be input to the external output apparatus through the external device interface 130.

The audio signal processed by the controller 170 may be output to the audio output device 185 as an audio signal. In addition, audio signal processed by the controller 170 may be input to the external output apparatus through the external device interface 130.

Although not shown in FIG. 3, the controller 170 may include a demultiplexer, an image processor, and the like. That is, the controller 170 may perform a variety of signal processing and thus it may be implemented in the form of a system on chip (SOC). This will be described later with reference to FIG. 4.

In addition, the controller 170 can control the overall operation of the image display apparatus 100. For example, the controller 170 may control the tuner device 110 to control the tuning of the RF broadcast corresponding to the channel selected by the user or the previously stored channel.

In addition, the controller 170 may control the image display apparatus 100 according to a user command input through the user input interface 150 or an internal program.

Meanwhile, the controller 170 may control the display 180 to display an image. At this time, the image displayed on the display 180 may be a still image or a moving image, and may be a 2D image or a 3D image.

Meanwhile, the controller 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the controller 170 may recognize the position of the user based on the image photographed by a photographing device (not shown). For example, the distance (z-axis coordinate) between a user and the image display apparatus 100 can be determined. In addition, the x-axis coordinate and the y-axis coordinate in the display 180 corresponding to a user position can be determined.

The display 180 generates a driving signal by converting an image signal, a data signal, an OSD signal, a control signal processed by the controller 170, an image signal, a data signal, a control signal, and the like received from the external device interface 130.

Meanwhile, the display 180 may be configured as a touch screen and used as an input device in addition to an output device.

The audio output device 185 receives a signal processed by the controller 170 and outputs it as an audio.

The photographing device (not shown) photographs a user. The photographing device (not shown) may be implemented by a single camera, but the present invention is not limited thereto and may be implemented by a plurality of cameras. Image information photographed by the photographing device (not shown) may be input to the controller 170.

The controller 170 may sense a gesture of the user based on each of the images photographed by the photographing device (not shown), the signals detected from the sensor device (not shown), or a combination thereof.

The power supply 190 supplies corresponding power to the image display apparatus 100. Particularly, the power may be supplied to a controller 170 which can be implemented in the form of a system on chip (SOC), a display 180 for displaying an image, and an audio output device 185 for outputting an audio.

Specifically, the power supply 190 may include a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 3 is a block diagram for an embodiment of the present invention. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present invention, and specific operation and apparatus do not limit the scope of the present invention.

Figure 4:
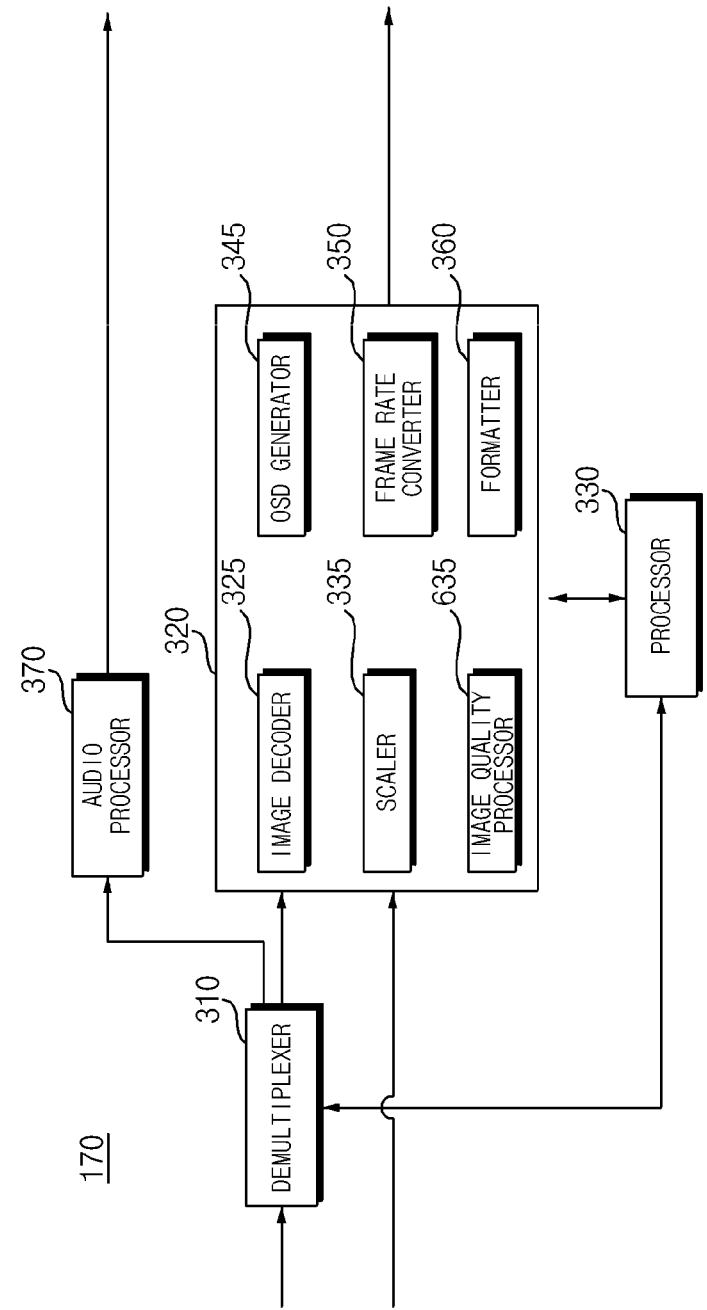
FIG. 4 is an example of an internal block diagram of a controller of FIG. 3.

FIG. 4 is an example of an internal block diagram of a controller of FIG. 3.

Referring to the drawing, the controller 170 according to an embodiment of the present disclosure may include a demultiplexer 310, an image processor 320, a processor 330, and an audio processor 370. In addition, the controller 170 may further include and a data processor (not shown).

The demultiplexer 310 demultiplexes the input stream. For example, when an MPEG-2 TS is input, it can be demultiplexed into image, audio, and data signal, respectively. Here, the stream signal input to the demultiplexer 310 may be a stream signal output from the tuner device 110, the demodulator 120, or the external device interface 130.

The image processor 320 may perform signal processing on an input image. For example, the image processor 320 may perform image processing on an image signal demultiplexed by the demultiplexer 310.

To this end, the image processor 320 may include an image decoder 325, a scaler 335, an image quality processor 635, an image encoder (not shown), an OSD processor 340, a frame rate converter 350, a formatter 360, etc.

The image decoder 325 decodes a demultiplexed image signal, and the scaler 335 performs scaling so that the resolution of the decoded image signal can be output from the display 180.

The image decoder 325 can include a decoder of various standards. For example, a 3D image decoder for MPEG-2, H.264 decoder, a color image, and a depth image, and a decoder for a plurality of view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the image decoder 325 or the like.

For example, the image quality processor 625 may perform noise reduction processing on an input image signal, extend a resolution of high gray level of the input image signal, perform image resolution enhancement, perform high dynamic range (HDR)-based signal processing, change a frame rate, perform image quality processing appropriate for properties of a panel, especially an OLED panel, etc.

The OSD processor 340 generates an OSD signal based on a user input or by itself. For example, based on a user input signal, the OSD processor 340 may generate a signal for displaying various information as a graphic or a text on the screen of the display 180. The generated OSD signal may include various data such as a user interface screen of the image display apparatus 100, various menu screens, a widget, and an icon. In addition, the generated OSD signal may include a 2D object or a 3D object.

In addition, the OSD processor 340 may generate a pointer that can be displayed on the display, based on a pointing signal input from the remote controller 200. In particular, such a pointer may be generated by a pointing controller, and the OSD processor 340 may include such a pointing controller (not shown). Obviously, the pointing controller (not shown) may be provided separately from the OSD processor 340.

The Frame Rate Converter (FRC) 350 may convert a frame rate of the input image. The frame rate converter 350 may output the image as it is without separate frame rate conversion.

Meanwhile, the formatter 360 may change a format of an input image signal into a format suitable for displaying the image signal on a display and output the image signal in the changed format.

In particular, the formatter 360 may change a format of an image signal to correspond to a display panel.

The processor 330 may control overall operations of the image display apparatus 100 or the controller 170.

For example, the processor 330 may control the tuner device 110 to control the tuning of an RF broadcast corresponding to a channel selected by a user or a previously stored channel.

In addition, the processor 330 may control the image display apparatus 100 based on a user command input through the user input interface 150 or an internal program.

In addition, the processor 330 may transmit data to the network interface 135 or to the external apparatus interface 130.

In addition, the processor 330 may control the demultiplexer 310, the image processor 320, and the like in the controller 170.

Meanwhile, the audio processor 370 in the controller 170 may perform the audio processing of the demultiplexed audio signal. To this end, the audio processor 370 may include various decoders.

In addition, the audio processor 370 in the controller 170 may process a base, a treble, a volume control, and the like.

The data processor (not shown) in the controller 170 may perform data processing of the demultiplexed data signal. For example, when the demultiplexed data signal is a coded data signal, it can be decoded. The encoded data signal may be electronic program guide information including broadcast information such as a start time and an end time of a broadcast program broadcasted on each channel.

Meanwhile, a block diagram of the controller 170 shown in FIG. 4 is a block diagram for an embodiment of the present disclosure. Each component of the block diagram may be integrated, added, or omitted according to a specification of the controller 170 actually implemented.

In particular, the frame rate converter 350 and the formatter 360 may be provided separately in addition to the image processor 320.

Figure 5:
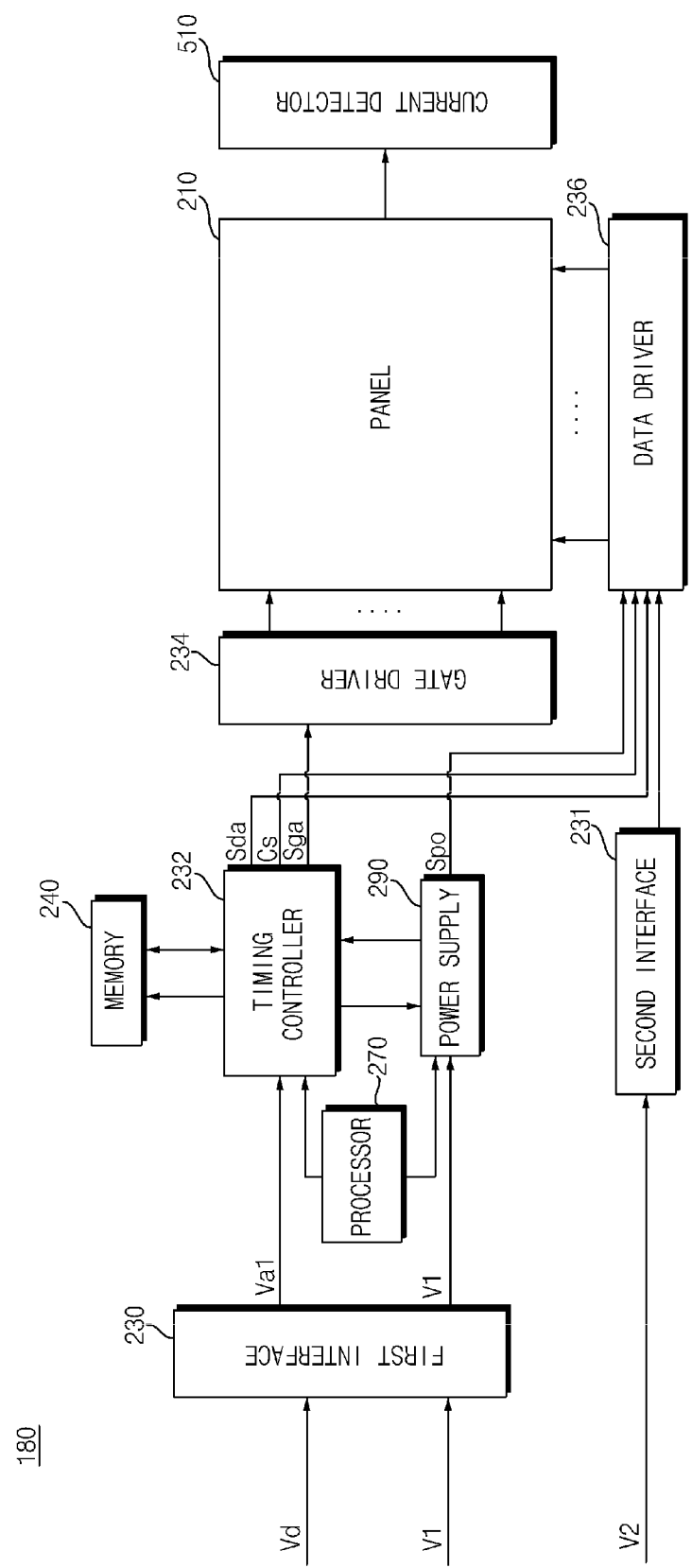
FIG. 5 is an internal block diagram of a display of FIG. 3.

FIG. 5 is an internal block diagram of a display of FIG. 3.

Referring to the drawing, the organic light emitting diode panel-based display 180 may include an organic light emitting diode panel 210, a first interface 230, a second interface 231, a timing controller 232, a gate driver 234, a data driver 236, a memory 240, a processor 270, a power supply 290, a current detector 510, and the like.

The display 180 receives an image signal Vd, a first DC power V1, and a second DC power V2, and may display a certain image based on the image signal Vd.

Meanwhile, the first interface 230 in the display 180 may receive the image signal Vd and the first DC power V1 from the controller 170.

Here, the first DC power V1 may be used for the operation of the power supply 290 and the timing controller 232 in the display 180.

Next, the second interface 231 may receive a second DC power V2 from an external power supply 190. Meanwhile, the second DC power V2 may be input to the data driver 236 in the display 180.

The timing controller 232 may output a data driving signal Sda and a gate driving signal Sga, based on the image signal Vd.

For example, when the first interface 230 converts the input image signal Vd and outputs the converted image signal va1, the timing controller 232 may output the data driving signal Sda and the gate driving signal Sga based on the converted image signal va1.

The timing controller 232 may further receive a control signal, a vertical synchronization signal Vsync, and the like, in addition to the image signal Vd from the controller 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

At this time, when the panel 210 comprises a RGBW subpixel, the data driving signal Sda may be a data driving signal for driving of RGBW subpixel.

Meanwhile, the timing controller 232 may further output a control signal Cs to the gate driver 234.

The gate driver 234 and the data driver 236 supply a scan signal and an image signal to the organic light emitting diode panel 210 through a gate line GL and a data line DL respectively, according to the gate driving signal Sga and the data driving signal Sda from the timing controller 232. Accordingly, the organic light emitting diode panel 210 displays a certain image.

Meanwhile, the organic light emitting diode panel 210 may include an organic light emitting layer. In order to display an image, a plurality of gate lines GL and data lines DL may be disposed in a matrix form in each pixel corresponding to the organic light emitting layer.

Meanwhile, the data driver 236 may output a data signal to the organic light emitting diode panel 210 based on a second DC power V2 from the second interface 231.

The power supply 290 may supply various power supplies to the gate driver 234, the data driver 236, the timing controller 232, and the like.

The current detector 510 may detect the current flowing in a sub-pixel of the organic light emitting diode panel 210. The detected current may be input to the processor 270 or the like, for a cumulative current calculation.

The processor 270 may perform each type of control of the display 180. For example, the processor 270 may control the gate driver 234, the data driver 236, the timing controller 232, and the like.

Meanwhile, the processor 270 may receive current information flowing in a sub-pixel of the organic light emitting diode panel 210 from the current detector 510.

In addition, the processor 270 may calculate the accumulated current of each subpixel of the organic light emitting diode panel 210, based on information of current flowing through the subpixel of the organic light emitting diode panel 210. The calculated accumulated current may be stored in the memory 240.

Meanwhile, the processor 270 may determine as burn-in, if the accumulated current of each sub-pixel of the organic light emitting diode panel 210 is equal to or greater than an allowable value.

For example, if the accumulated current of each subpixel of the OLED panel 210 is equal to or higher than 300000 A, the processor 270 may determine which a corresponding subpixel is a burn-in subpixel.

Meanwhile, if the accumulated current of each subpixel of the OLED panel 210 is close to an allowable value, the processor 270 may determine which a corresponding subpixel is a subpixel expected to be burn in.

Meanwhile, based on a current detected by the current detector 510, the processor 270 may determine which a subpixel having the greatest accumulated current is an expected burn-in subpixel.

Figure 6A:
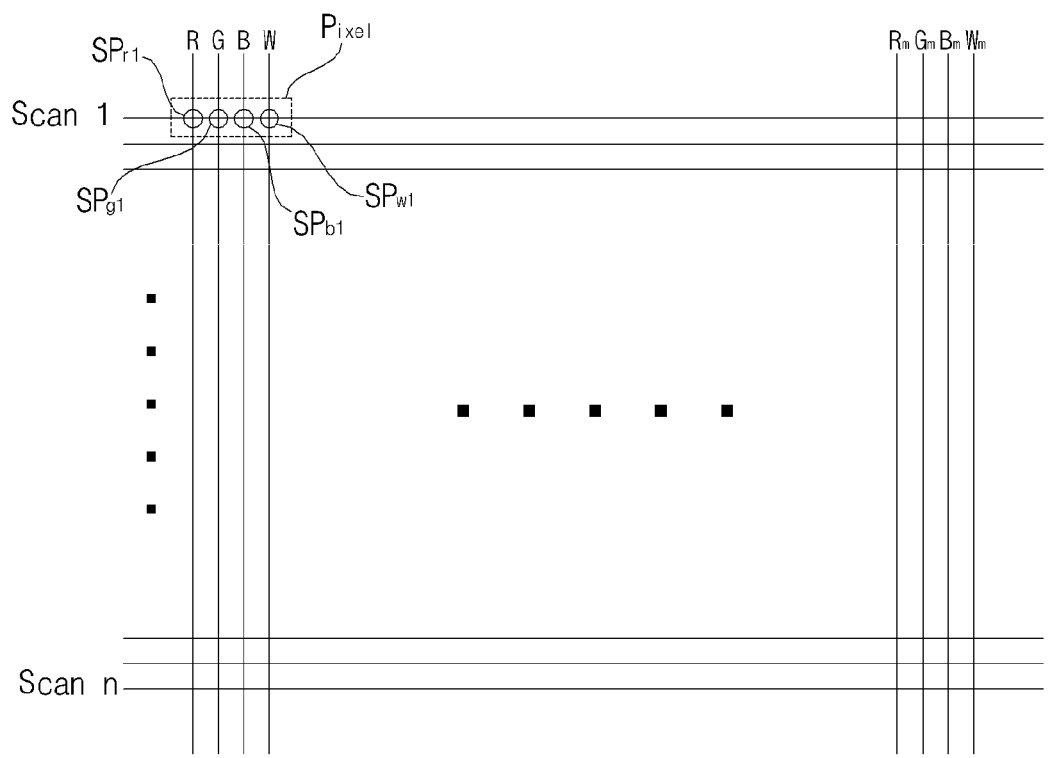
FIG. 6A and FIG. 6B are diagrams referred to in the description of an organic light emitting diode panel of FIG. 5.
Figure 6B:
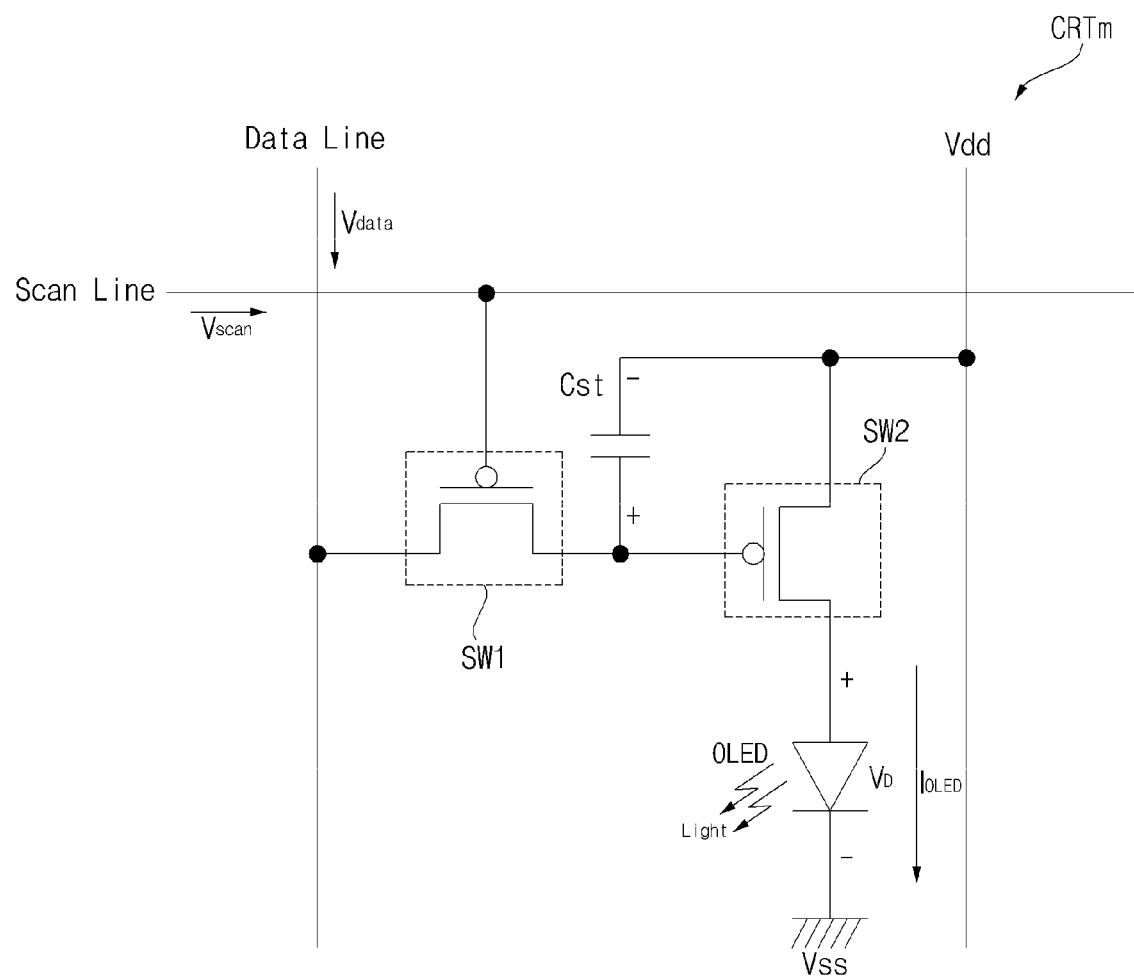

FIG. 6A and FIG. 6B are diagrams referred to in the description of an organic light emitting diode panel of FIG. 5.

Firstly, FIG. 6A is a diagram illustrating a pixel in the organic light emitting diode panel 210.

Referring to drawing, the organic light emitting diode panel 210 may include a plurality of scan lines Scan 1 to Scan n and a plurality of data lines R1, G1, B1, W1 to Rm, Gm, Bm, Wm intersecting the scan lines.

Meanwhile, a pixel (subpixel) is defined in an intersecting area of the scan line and the data line in the organic light emitting diode panel 210. In the drawing, a pixel including sub-pixels SR1, SG1, SB1 and SW1 of RGBW is shown.

FIG. 6B illustrates a circuit of any one sub-pixel in the pixel of the organic light emitting diode panel of FIG. 6A.

Referring to drawing, an organic light emitting sub pixel circuit (CRTm) may include, as an active type, a scan switching element SW1, a storage capacitor Cst, a drive switching element SW2, and an organic light emitting layer (OLED).

The scan switching element SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

The storage capacitor Cst is formed between the gate terminal and the source terminal of the drive switching element SW2, and stores a certain difference between a data signal level transmitted to one end of the storage capacitor Cst and a DC power (VDD) level transmitted to the other terminal of the storage capacitor Cst.

For example, when the data signal has a different level according to a Plume Amplitude Modulation (PAM) method, the power level stored in the storage capacitor Cst varies according to the level difference of the data signal Vdata.

For another example, when the data signal has a different pulse width according to a Pulse Width Modulation (PWM) method, the power level stored in the storage capacitor Cst varies according to the pulse width difference of the data signal Vdata.

The drive switching element SW2 is turned on according to the power level stored in the storage capacitor Cst. When the drive switching element SW2 is turned on, the driving current (IOLED), which is proportional to the stored power level, flows in the organic light emitting layer (OLED). Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), and an electron injecting layer (EIL). In addition, it may include a hole blocking layer, and the like.

Meanwhile, all the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further comprises green, red, and blue color filters. Meanwhile, since a white subpixel outputs a white light, a separate color filter is not required.

Meanwhile, in the drawing, it is illustrated that a p-type MOSFET is used for a scan switching element SW1 and a drive switching element SW2, but an n-type MOSFET or other switching element such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

Figure 7:
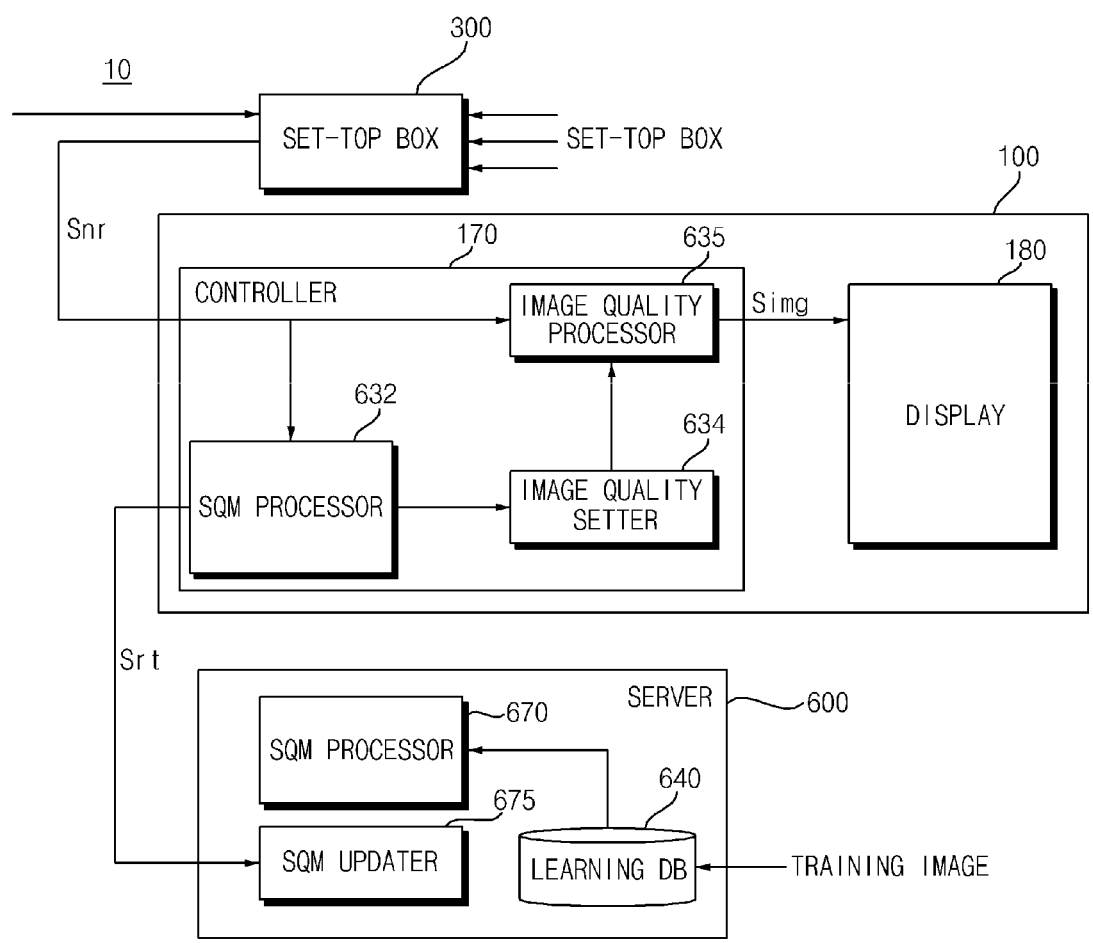
FIG. 7 is an example of an internal block diagram of a controller according to an embodiment of the present disclosure.
Figure 8:
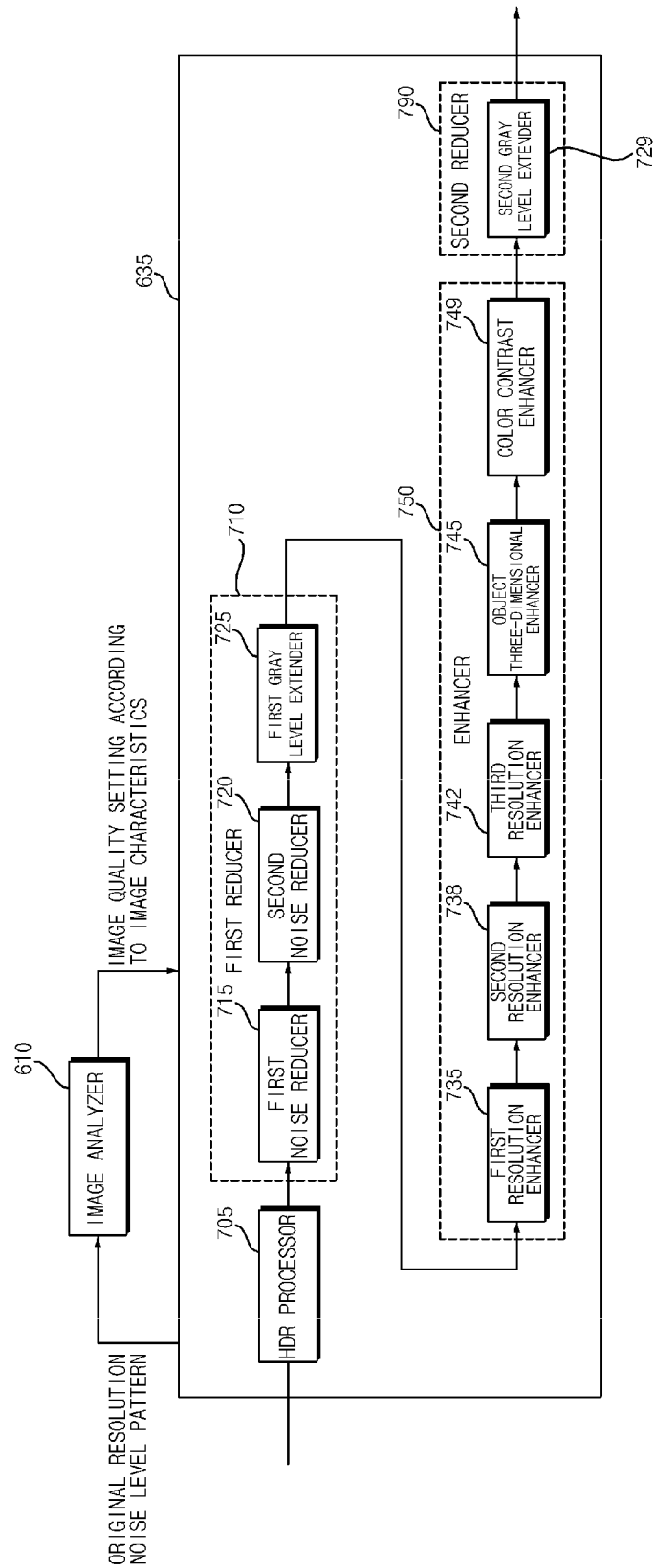
FIGS. 8 to 9B are diagrams referred to in the description of operation of the controller of FIG. 7.

FIG. 7 is an example of an internal block diagram of a controller according to an embodiment of the present invention, and FIGS. 8 to 9B are diagrams referred to in the description of operation of the controller of FIG. 7.

First, referring to FIG. 7, an image display system 10 according to an embodiment of the present disclosure may include an image display apparatus 100, a server 600, and a set-top box 300.

The server 600 may include a learning DB 640 configured to receive a training image and store the received training image; a quality calculator 670 configured to calculate an image source quality using the training image from the learning DB 6400 and a Deep Neural Network (DNN); and an parameter updater 675 configured to update a parameter for the DNN based on the learning DB 640 and the quality calculator 670.

The parameter updater 675 may transmit the updated parameter to a quality calculator 632 of the image display apparatus 100.

The set-top box 300 may receive an input signal from an image provider, and transmit the image signal to an HDMI terminal of the image display apparatus 100.

The image display apparatus 100 may include: an image receiver 105 configured to receive an image signal via an external set-top box 300 or a network; a controller 170 configured to perform signal processing on the image signal received by the image receiver 105; and a display 180 configured to display an image processed by the controller 170.

Meanwhile, the image display apparatus 100 may apply an optimal tuning for the quality of an input image.

Meanwhile, the image display apparatus 100 may analyze an input image in real time to determine an original resolution, a noise level, a compression level, and an enhancement level of the input image.

Meanwhile, the image display apparatus 100 may change an image quality setting based on calculated image information data without causing a sense of discomfort or distortion.

Meanwhile, the controller 170 may include: the quality calculator 632 configured to calculate original quality of an image signal received from the external set-top box 300 or a network; an image quality setter 634 configured to set the quality of the image signal; and an image quality processor 635 configured to perform image quality processing on the image signal according to the set quality.

If original quality of a received image signal is changed at a first point in time, the image quality setter 634 changes an image quality setting from a first setting to a second setting in a sequence and the image quality processor 635 may perform image quality processing according to the sequential change of the first setting to the second setting. Accordingly, it is possible to reduce flicker when the image quality is changed due to the change of the original quality of the received image signal. In particular, when the original quality of the image signal is changed, the quality may be changed smoothly rather than radically.

Meanwhile, if original quality of a received image signal is modified at a first point in time while an image is reproduced, the image quality setter 634 may sequentially change an image quality setting from a first setting to a second setting. Accordingly, when the original quality of the received image signal is changed, it is possible to change the image quality setting in real time. In particular, when the original quality of the image signal is changed, the image quality may be changed smoothly rather than radically.

Meanwhile, if original quality of a received image signal is changed at a first point in time due to a channel change or an input change while the image signal is received from the set-top box 300, the image quality setter 634 change the image quality from a first setting to a second setting in a sequence. Accordingly, it is possible to reduce flicker when the image quality is changed due to the original quality of the received image signal is changed. In particular, when the original quality of the image signal is changed, the image quality may be changed smoothly rather than radically.

The quality calculator 632 may classify an input image as an UHD (3840×2160 or more), FHD (1920×1080), HD (1280×720), or SD (720×480 or less) image.

The quality calculator 632 may calculate a probability for each resolution with respect to an input image, select a resolution having the highest probability as the final resolution and exclude a resolution having a too low probability.

The quality calculator 632 may anticipate a noise level and a compression level in addition to the resolution.

Meanwhile, when calculating the compression level, the quality calculator 632 may determine the compression level based on training data obtained by reducing a compression bit-rate with reference to an original state.

For example, for FHD, the quality calculator 632 may evaluate the current digital TV broadcasting standard as 1.0 and calculate such that the value can be reduced to 0.0 when data be lost as compressed too much.

Meanwhile, the quality calculator 632 may calculate a noise level by measuring a level of flicker in an input image.

For example, the quality calculator 632 may calculate a level of noise in an input image into one of four levels that are high level, medium level, low level, and no-noise level.

Meanwhile, the quality calculator 632 may calculate a resolution and a noise level of a received image signal using a DNN. Accordingly, it is possible to accurately calculate original quality of the received image.

Meanwhile, the quality calculator 632 may update a parameter for the DNN from the server 600, and calculate a resolution and a noise level of a received image signal based on the updated parameter. Accordingly, it is possible to accurately calculate original quality of an image signal based on learning.

Meanwhile, the quality calculator 632 may extract a first region and a second region from the image signal, and calculate an original resolution of the image signal based on the first region and a noise level of the image signal based on the second region. Accordingly, it is possible to accurately calculate the original quality of the image signal based on extraction of a region suitable for the quality calculation.

Meanwhile, the quality calculator 632 may extract a region having the most edge components in the image signal as a first region, and extract a region having the least edge components in the image signal as a second region. Accordingly, it is possible to accurately calculate the original quality of the image signal based on extraction of a region suitable for the quality calculation.

Meanwhile, the image quality processor 635 may increase the noise reduction processing intensity for an image signal as the calculated noise level increases. Accordingly, it is possible to perform image quality processing appropriate for a noise level of a received image signal.

Meanwhile, the quality calculator 632 may calculate an original resolution, a noise level, and a compression level of a received image signal, and calculate the compression level based on training data obtained by reducing a compression bit rate.

Meanwhile, the image quality processor 635 may decrease the enhancement intensity for the image signal as the higher the calculated compression level increases. Accordingly, it is possible to accurately calculate the compression level.

Meanwhile, the image quality processor 635 may increase the enhancement intensity for the image signal as the original resolution of the image signal increases. Accordingly, it is possible to perform image quality processing appropriate for the original resolution of the received image signal.

Meanwhile, the image quality processor 635 may increase a blurring intensity for the image signal as the calculated compression level increases. Accordingly, it is possible to perform image quality processing appropriate for a compression level of a received image signal.

Meanwhile, the image quality processor 635 may decrease the filter used to filter the image signal as the original resolution of the image signal increases. Accordingly, it is possible to perform image quality processing appropriate for the original resolution of the received image signal.

Meanwhile, the image quality processor 635 may downscale an image signal according to an original resolution of an image signal, perform image quality processing on the downscaled image signal, upscales the image-quality-processed image signal, and output the upscaled image signal. Accordingly, it is possible to perform image quality processing appropriate for the original resolution of the received image signal.

FIG. 8 is an example of an internal block diagram of the controller 170 of FIG. 7.

Meanwhile, the controller 170 in FIG. 8 may correspond to the controller 170 in FIG. 3.

First, referring to FIG. 8, the controller 170 according to an embodiment of the present invention may include an image analyzer 610 and an image quality processor 635.

The image analyzer 610 may include the quality calculator 632 shown in FIG. 7 and an image quality setter 634.

The image analyzer 610 may analyze an input image signal, and output information related to the analyzed input image signal.

Meanwhile, the image analyzer 610 may differentiate an object region and a background region of a first input image signal. Alternatively, the image analyzer 610 may calculate a probability or percentage of the object region and the background region of the first input image signal.

The input image signal may be an input image signal from an image receiver 105 or an image decoded by the image decoder 320 in FIG. 4.

In particular, the image analyzer 610 may analyze an input image signal using artificial intelligence (AI), and output information on the analyzed input image signal.

Specifically, the image analyzer 610 may output a resolution, gray level, a noise level, and a pattern of an input image signal, and output information on the analyzed input image signal, especially image setting information, to the image quality processor 635.

The image quality processor 635 may include an HDR processor 705, a first reducer 710, an enhancer 750, and a second reducer 790.

The HDR processor 705 may receive an image signal and perform high dynamic range (HDR) processing on the input image signal.

For example, the HDR processor 705 may convert a standard dynamic range (SDR) image signal into an HDR image signal.

For another example, the HDR processor 705 may receive an image signal, and perform gray level processing on the input image signal for an HDR.

Meanwhile, if an input image signal is an SDR image signal, the HDR processor 705 may bypass gray level conversion, and, if an input image signal is an HDR image signal, the HDR processor 705 perform gray level conversion. Accordingly, it is possible to improve high gray level expression for an input image.

Meanwhile, the HDR processor 705 may perform gray level conversion processing based on a first gray level conversion mode, in which low gray level is to be enhanced and high gray level is to be saturated, and a second gray level conversion mode, in which low gray level and high gray level are somewhat uniformly converted.

Specifically, if the first gray level conversion mode is implemented, the HDR processor 705 may perform gray level conversion processing based on data corresponding to the first gray level conversion mode in a lookup table.

More specifically, if the first gray level conversion mode is implemented, the HDR processor 705 may perform gray level conversion processing based on an equation for input data and the first gray level conversion mode in a lookup table determined by the equation. Here, the input data may include video data and metadata.

Meanwhile, if the second gray level conversion mode is implemented, the HDR processor 705 may perform gray level conversion processing based on data corresponding to the second gray level conversion mode in a lookup table.

More specifically, if the second gray level conversion mode is implemented, the HDR processor 705 may perform gray level conversion processing based on an equation for input data and data corresponding to the second gray level conversion mode in a lookup table determined by the equation. Here, the input data may include video data and metadata.

Meanwhile, the HDR processor 705 may select the first gray level conversion mode or the second gray level conversion mode according to a third gray level conversion mode or a fourth gray level conversion mode in a high gray level amplifier 851 in the second reducer 790.

For example, if the third gray level conversion mode is implemented, the high gray level amplifier 851 in the second reducer 790 may perform gray level conversion processing based on data corresponding to the third gray level conversion mode in a lookup table.

Specifically, if the third gray level conversion mode is implemented, the high gray level amplifier 851 in the second reducer 790 may perform gray level conversion processing based on an equation for input data and data corresponding to the third gray level conversion mode in a lookup table determined by the equation. Here, the input data may include video data and metadata.

Meanwhile, if the fourth type gray level conversion is implemented, the high gray level amplifier 851 in the second reducer 790 may perform gray level conversion processing based on data corresponding to the fourth gray level conversion mode in a lookup table.

Specifically, if the fourth gray level conversion mode is implemented, the high gray level amplifier 851 in the second reducer 790 may perform gray level conversion processing based on an equation for input data and data corresponding to the fourth gray level conversion mode in a lookup table determined by the equation. Here, the input data may include video data and metadata.

For example, if the fourth gray level conversion mode is implemented in the high gray level amplifier 851 in the second reducer 790, the HDR processor 705 may implement the second gray level conversion mode.

For another example, if the third gray level conversion mode is implemented in the high gray level amplifier 851 in the second reducer 790, the HDR processor 705 may implement the first gray level conversion mode.

Alternatively, the high gray level amplifier 851 in the second reducer 790 may change a gray level conversion mode according to a gray level conversion mode in the HDR processor 705.

For example, if the second gray level conversion mode is implemented in the HDR processor 705, the high gray level amplifier 851 in the second reducer 790 may perform the fourth gray level conversion mode.

For another example, if the first gray level conversion mode is implemented in the HDR processor 705, the high gray level amplifier 851 in the second reducer 790 may implement the third gray level conversion mode.

Meanwhile, the HDR processor 705 according to an embodiment of the present invention may implement a gray level conversion mode so that low gray level and high gray level are converted uniformly.

Meanwhile, according to the second gray level conversion mode in the HDR processor 705, the second reducer 790 may implement the fourth gray level conversion mode and thereby amplify an upper limit on gray level of a received input signal. Accordingly, it is possible to improve high gray level expression for the input image.

Next, the first reducer 710 may perform noise reduction on an input image signal or an image signal processed by the HDR processor 705.

Specifically, the first reducer 710 may perform a plurality of stages of noise reduction processing and a first stage of gray level extension processing on an input image signal or an HDR image from the HDR processor 705.

To this end, the first reducer 710 may include a plurality of noise reducers 715 and 720 for reducing noise in a plurality of stages, and a first gray level extender 725 for extending gray level.

Next, the enhancer 750 may perform a plurality of stages of image resolution enhancement processing on an image from the first reducer 710.

In addition, the enhancer 750 may perform object three-dimensional effect enhancement processing. In addition, the enhancer 750 may perform color or contrast enhancement processing.

To this end, the enhancer 750 may include: a plurality of resolution enhancers 735, 738, 742 for enhancing a resolution of an image in a plurality of stages; an object three-dimensional effect enhancer 745 for enhancing a three-dimensional effect of an object; and a color contrast enhancer 749 for enhancing color or contrast.

Next, the second reducer 790 may perform a second stage of gray level extension processing based on a noise-reduced image signal received from the first reducer 710.

Meanwhile, the second reducer 790 may amplify an upper limit on gray level of an input signal, and extend a resolution of high gray level of the input signal. Accordingly, it is possible to improve high gray level expression for an input image.

For example, gray level extension may be performed uniformly on the entire gray level range of an input signal. Accordingly, gray level extension is performed uniformly on the entire area of an input image, thereby improving high gray level expression.

Meanwhile, the second reducer 790 may perform gray level amplification and extension based on a signal received from the first gray level extender 725. Accordingly, it is possible to improve high gray level expression for an input image.

Meanwhile, if an input image signal input is an SDR image signal, the second reducer 790 may vary the degree of amplification based on a user input signal. Accordingly, it is possible to improve high gray level expression in response to a user setting.

Meanwhile, if an input image signal is an HDR image signal, the second reducer 790 may perform amplification according to a set value. Accordingly, it is possible to improve high gray level expression for an input image.

Meanwhile, if an input image signal is an HDR image signal, the second reducer 790 may vary the degree of amplification based on a user input signal. Accordingly, it is possible to improve high gray level expression according to a user setting.

Meanwhile, in the case of extending gray level based on a user input signal, the second reducer 790 may vary the degree of extension of gray level. Accordingly, it is possible to improve high gray level expression according to a user's setting.

Meanwhile, the second reducer 790 may amplify an upper limit on gray level according to a gray level conversion mode in the HDR processor 705. Accordingly, it is possible to improve high gray level expression for an input image.

The controller 170 comprises the HDR processor 705 configured to receive an image signal and adjust luminance of the input image signal, and the reducer 790 configured to amplify brightness of the image signal received from the HDR processor 705 and increase gray level resolution of the image signal to thereby generate an enhanced image signal. The enhanced image signal provides increased luminance and increased gray level resolution of the image signal while a high dynamic range in a displayed HDR image is maintained.

Meanwhile, the range of brightness of the image signal is adjusted by a control signal received by the controller 170.

Meanwhile, the controller 170 further comprises an image analyzer configured to determine whether an input image signal is an HDR signal or an SDR signal, and generate a control signal to be provided to the HDR processor 705. The range of brightness of an input image signal is adjusted by a control signal only when the input image signal is an HDR signal.

Meanwhile, the control signal is received from a controller of an image display apparatus, which relates to signal processing, and the control signal corresponds to a setting of the image display apparatus.

Meanwhile, a resolution of gray level is increased based on amplification of adjusted brightness of an image signal.

Meanwhile, a resolution of gray level is increased based on a control signal received by the controller 170.

Meanwhile, a control signal is received from a controller of an image display apparatus, which relates to signal processing, and the control signal corresponds to a setting of the image display apparatus.

Meanwhile, the reducer 790 may include the high gray level amplifier 851 configured to amplify an upper limit on gray level of an input signal, and a decontourer 842 and 844 configured to extend the resolution of gray level amplified by the high gray level amplifier 851.

The second reducer 790 may include a second gray level extender 729 for a second stage of gray level extension.

Meanwhile, the image quality processor 635 in the controller 170 according to the present invention is characterized in performing four stages of reduction processing and four stages of image enhancement processing, as shown in FIG. 8.

Here, the four stages of reduction processing may include two stages of noise reduction processing and two stages of gray level extension processing.

Herein, the two stages of noise reduction processing may be performed by the first and second noise reducers 715 and 720 in the first reducer 710, and the two stages of gray level extension processing may be performed by the first gray level extender 725 in the first reducer 710 and the second gray level extender 729 in the second reducer 790.

Meanwhile, the four stages of image enhancement processing may include three stages of image resolution enhancement (bit resolution enhancement) and object three-dimensional effect enhancement.

Here, the three stages of image enhancement processing may be performed by the first to third resolution enhancers 735, 738, and 742, and the object three-dimensional effect enhancement may be performed by the object three-dimensional enhancer 745.

Meanwhile, the controller 170 of the present disclosure may perform image quality processing in a plurality of stages, in which an image quality may be improved gradually by applying the same algorithm or similar algorithms a plurality of times.

To this end, the image quality processor 635 of the controller 170 of the present disclosure may perform image quality processing by applying the same algorithm or similar algorithms two or more times.

Meanwhile, the same algorithm or the similar algorithms implemented by the image quality processor 635 have a different purpose to achieve in each stage. In addition, since image quality processing is performed gradually in a plurality of stages, there is an advantageous effect to cause a less number of artifacts to appear in an image, resulting in a more natural and more vivid image processing result.

Meanwhile, the same algorithm or the similar algorithms are applied plurality of times alternately with a different image quality algorithm, thereby bringing an effect more than simple continuous processing.

Meanwhile, the controller 170 of the present disclosure may perform noise reduction processing in a plurality of stages. Each stage of the noise reduction processing may include temporal processing and spatial processing.

Meanwhile, in order to calculate an original quality of an image signal, the present disclosure uses the state-of-the-art technology such as artificial intelligence (AI). To this end, a Deep Neural Network (DNN) may be used.

The quality calculator 632 may calculate a resolution and a noise level of an input image signal by using a Deep Neural Network (DNN).

The quality calculator 632 or the quality calculator 670 may obtain an original resolution and a training image for each compression rate, and train the network so as to increase accuracy of the calculation.

A variety of images which can be commonly seen in ordinary broadcasting programs are provided as images used for the training, and thus, it is possible to cover any input environment.

Meanwhile, in order to reduce detection time or cost, the quality calculator 632 may perform learning using Convolutional Neural Network, Mobile-Net, and the like which has a small number of layers.

For example, the quality calculator 632 may analyze only some regions (e.g., 224×224, 128×128, 64×64, etc.) in an entire image.

Meanwhile, the quality calculator 632 may select a detection region appropriate for a purpose of detection.

For example, the quality calculator 632 may select a first region having the greatest number of edge components when detecting an original resolution, and select a second region having the least number of edge components when detecting noise.

In particular, the quality calculator 632 may apply an algorithm that selects a detection region in a short time in order to increase a processing speed.

For example, the quality calculator 632 may perform pre-processing, such as Fast Fourier Transform (FFT), on a detection region.

Figure 9A:
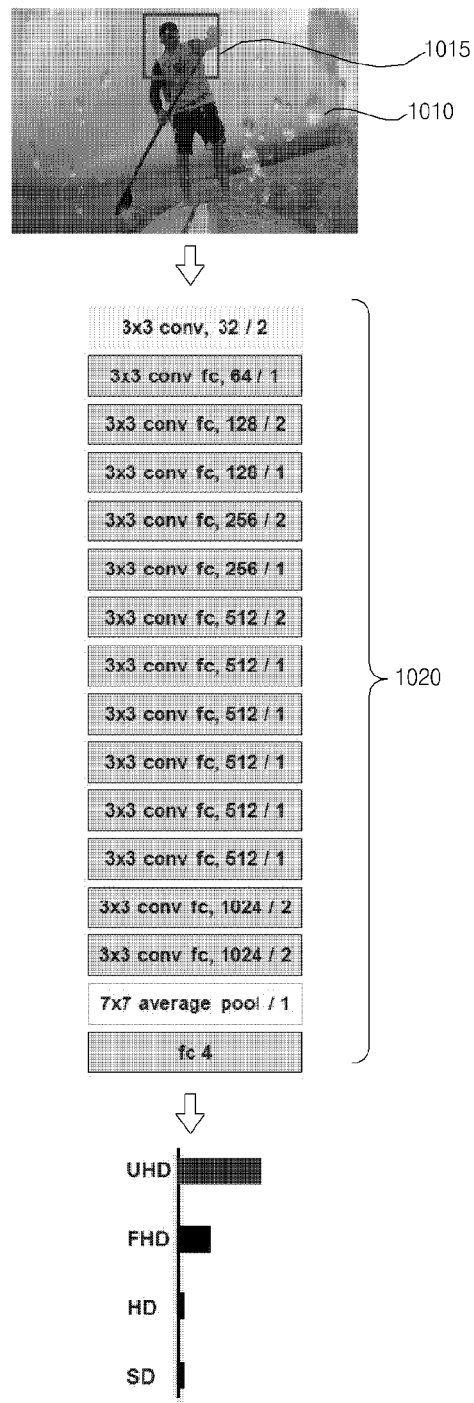

FIG. 9A is a diagram showing calculation based on a Convolutional Neural Network (CNN).

Referring to the drawing, a convolutional neural network is used for a particular region 1015 in an acquired image 1010.

As the convolution neural network, a convolution network and a deconvolution network may be implemented.

According to the convolution neural network, convolution and pooling are performed repeatedly.

Meanwhile, according to the CNN scheme shown in FIG. 9A, information on a region 1015 may be used to determine types of pixels in the region 1015.

FIG. 9B is a diagram showing calculation based on Mobile-Net.

According to the scheme shown in the drawing, quality calculation is performed.

Meanwhile, the controller 170 of the present disclosure may apply, as original quality changes, an image quality setting corresponding to the changed quality in real time.

In particular, in the case of changing an image quality setting, the controller 170 may apply the change of the image quality setting without any condition such as a channel change or an input change while an image is reproduced.

In this case, "real time" refers to employing a temporal processing technique including imaging infrared (IIR) and step movement.

Figure 10B:
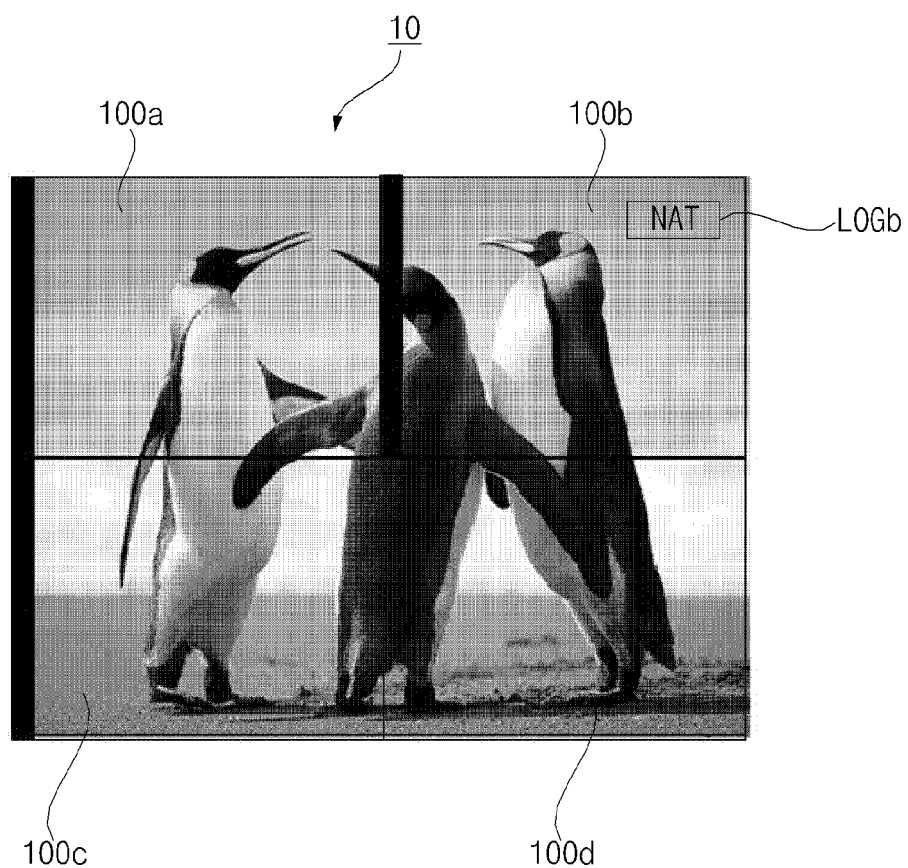
Figure 10C:
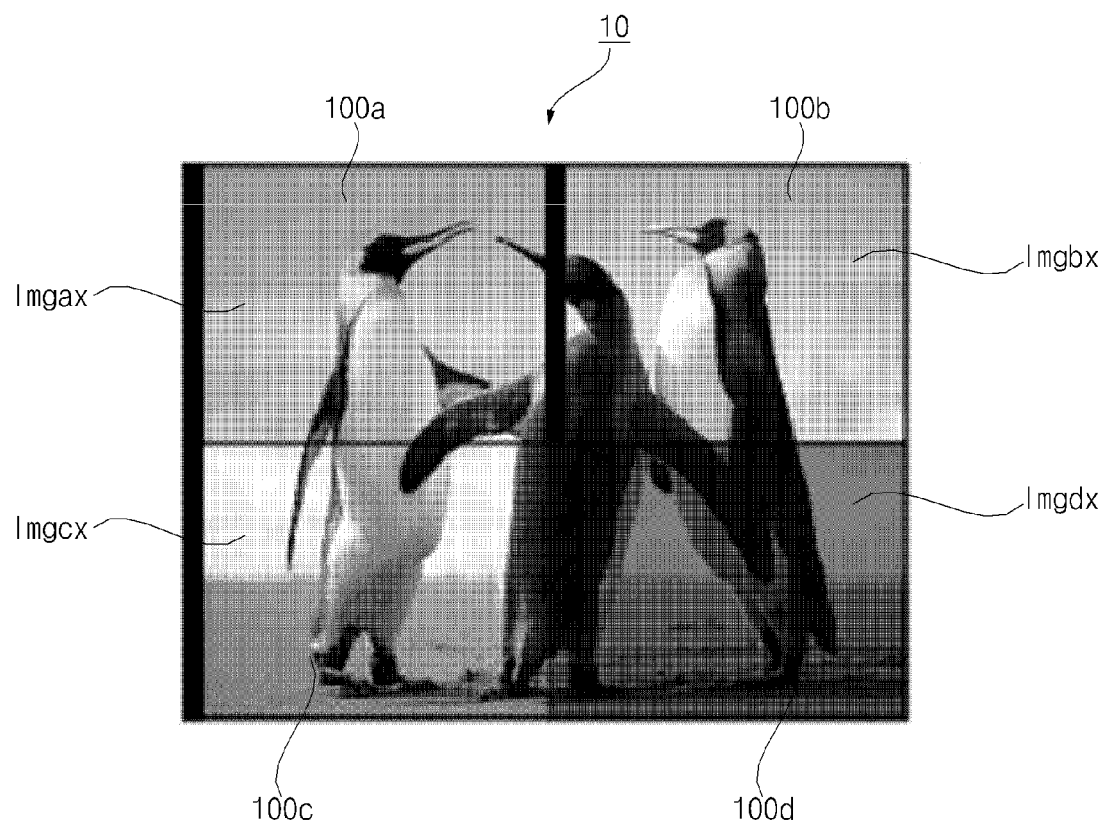

FIGS. 10A to 10C are diagrams referred to in the description of an afterimage on a video wall.

First, referring to FIG. 10A, if a logo LOGa is present in an input image Imgor to be displayed on the video wall 10, a logo area LOGa having the logo may be detected, and a luminance value BRb of the logo area LOGa may be set to a value lower than a luminance value BRa of a surrounding area of the logo.

Meanwhile, if the video wall 10 comprises 2*2 image display apparatuses 100a to 100d, the image divider 160 divides an input image into four 2*2 areas.

Accordingly, as illustrated in FIG. 10B, an image having a logo area LOGb with reduced luminance may be displayed on the video wall 10 including the 2*2 image display apparatuses 100a to 100d.

However, there is a problem in that although the logo detection method is used, an afterimage, which occurs during repeated playback of a video, may not be reduced.

Then, referring to FIG. 10C, when divided images Imgax to Imgdx are displayed on the video wall 10 through the displays 180a to 180d of the respective image display apparatuses 100a to 100d, a luminance value of the entire image Imgdx displayed on the display 180d of the fourth image display apparatus 100d may be set to a value lower than luminance values of other images Imgax to Imgcx, in order to prevent an afterimage.

In this case, a problem occurs in terms of visibility of the image, along with a problem in that an afterimage, which occurs during repeated playback of the video, may not be reduced.

Accordingly, the present disclosure provides a method of reducing an afterimage which may occur when a video is repeatedly played on the video wall 10.

Figure 11:
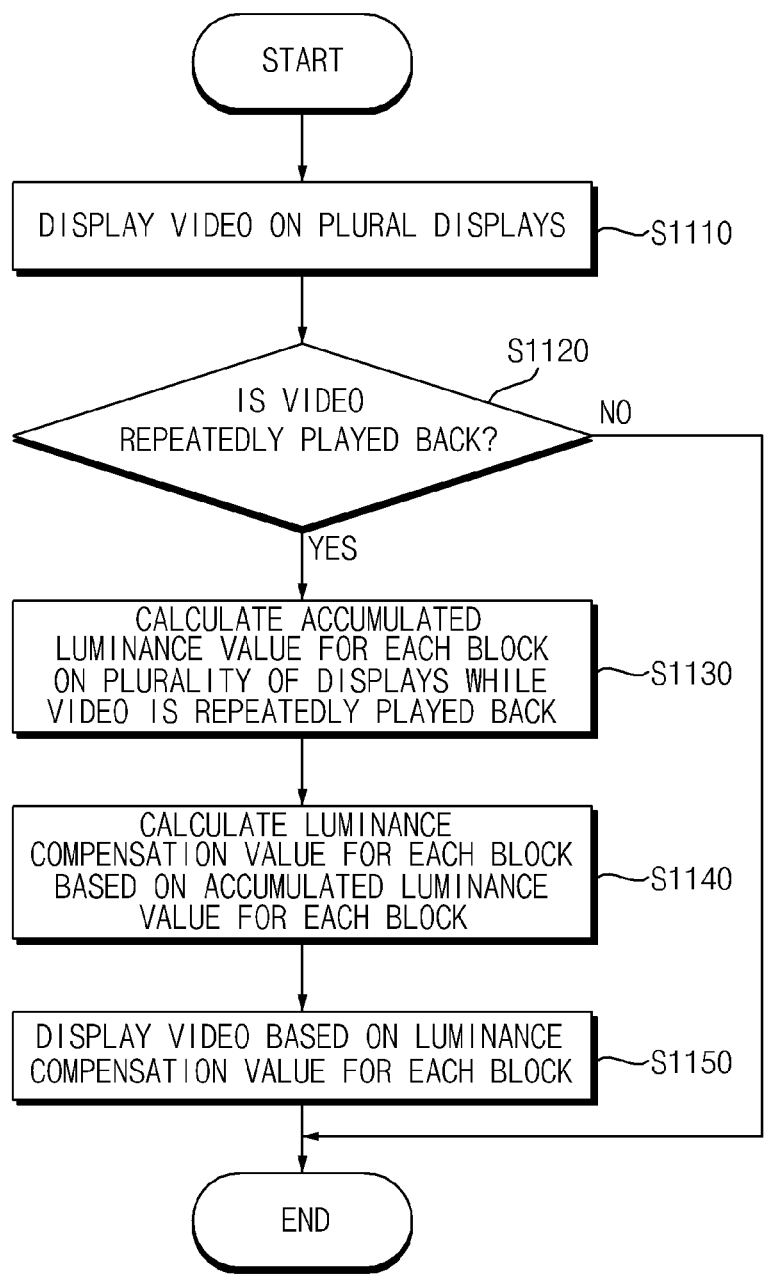
FIG. 11 is a flowchart illustrating an operating method of a video wall according to an embodiment of the present disclosure.
Figure 12:
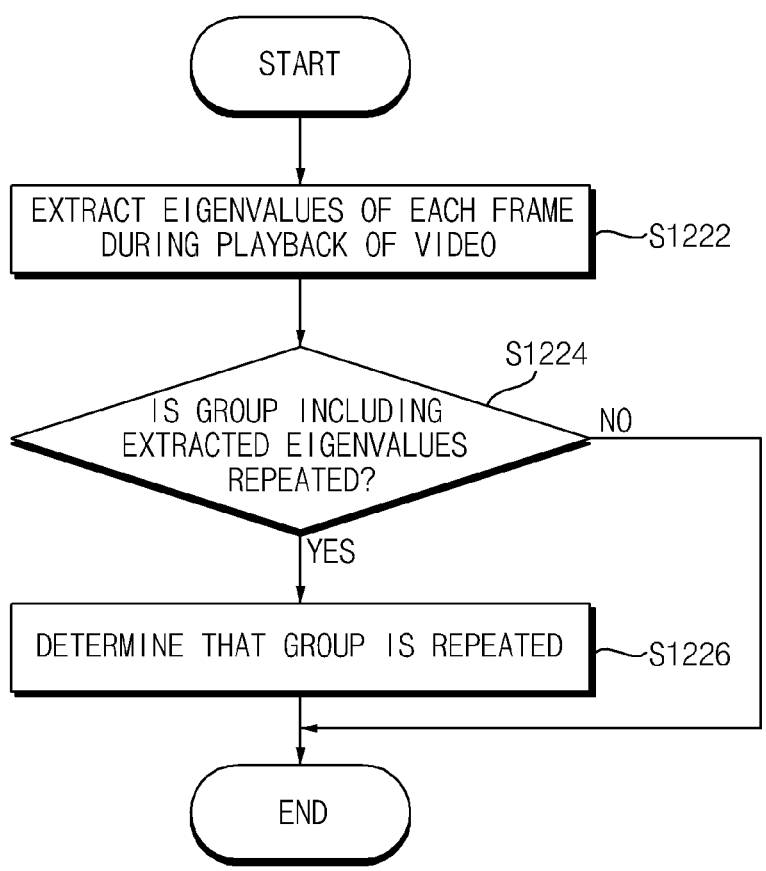
FIG. 12 is a flowchart illustrating an example of a method of determining whether a video is repeatedly played in FIG. 11.

FIG. 11 is a flowchart illustrating an operating method of a video wall according to an embodiment of the present disclosure; FIG. 12 is a flowchart illustrating an example of a method of determining whether a video is repeatedly played in FIG. 11; and FIGS. 13A to 20 are diagrams referred to in the description of operation of FIG. 11.

First, referring to FIG. 11, the plurality of image display apparatuses 100a to 100d in the video wall 10 may display an input video on the plurality of displays 180a to 180d (S1110).

To this end, the image divider 160 may divide the input video and transmit the divided plurality of videos to the respective image display apparatuses 100a to 100d.

Then, the first controller 170a in the first image display apparatus 100a determines whether the displayed video is repeatedly played back (S1120).

For example, the first controller 170a in the first image display apparatus 100a may extract eigenvalues of each frame during playback of the video, as illustrated in FIG. 12 (S1222).

The eigenvalues of each frame may include information indicating positions of each frame, ID information of each frame, or the like.

Further, the first controller 170a in the first image display apparatus 100a may determine whether a group including the extracted eigenvalues is repeated (S1224). In this case, the group may correspond to a sequence.

Then, if the group including the extracted eigenvalues is repeated, the first controller 170a in the first image display apparatus 100a may determine which the group is repeated (S1226).

Subsequently, if the displayed video is repeatedly played back, the controller 170a in the first image display apparatus 100a may transmit repeated playback information to the controllers 170a to 170d of the respective image display apparatuses 100a to 100d.

Meanwhile, upon receiving the repeated playback information, the controllers 170a to 170d of the respective image display apparatuses 100a to 100d may calculate an accumulated luminance value for each block on the plurality of displays 180a to 180d during a first period when the video is played back (S1130).

Next, based on the calculated accumulated luminance value for each block, the controllers 170a to 170d of the respective image display apparatuses 100a to 100d may calculate a luminance compensation value for each block (S1140).

Then, based on the luminance compensation value for each block, the controllers 170a to 170d of the respective image display apparatuses 100a to 100d may play back the video during the second period (S1150).

For example, as the calculated accumulated luminance value for each block increases, the controllers 170a to 170d of the respective image display apparatuses 100a to 100d may decrease a level of the luminance compensation value for each block. Accordingly, it is possible to efficiently reduce an afterimage on the video wall 10, on which the video is repeatedly displayed.

In another example, as the number of times of repeated playback of the video displayed on the plurality of image display apparatuses 100a to 100d increases, the controllers 170a to 170d of the respective image display apparatuses 100a to 100d may reduce the level of the luminance compensation value for each block. Accordingly, it is possible to efficiently reduce an afterimage on the video wall 10, on which the video is repeatedly displayed.

Meanwhile, the controllers 170a to 170d of the respective image display apparatuses 100a to 100d may set a level of the luminance compensation value of a red sub-pixel to be lower than a level of the luminance compensation value of a green sub-pixel. Accordingly, it is possible to maximize the effect of reducing an afterimage of the green sub-pixel having a shorter device lifespan.

Particularly, among the controllers 170a to 170d of the image display apparatuses 100a to 100d, the first controller 170a may set the level of the luminance compensation value of the red sub-pixel to be lower than the level of the luminance compensation value of the green sub-pixel, when displaying the video on the first display 180a. Accordingly, it is possible to maximize the effect of reducing an afterimage of the green sub-pixel having a shorter device lifespan.

Meanwhile, if the accumulated luminance value of the red sub-pixel is equal to that of the green sub-pixel, the controllers 170a to 170d of the respective image display apparatuses 100a to 100d may set a level of the luminance compensation value of the red sub-pixel to be lower than a level of the luminance compensation value of the green sub-pixel. Accordingly, it is possible to maximize the effect of reducing an afterimage of the green sub-pixel having a shorter device lifespan.

Particularly, if the accumulated luminance value of the red sub-pixel is equal to that of the green sub-pixel, the first controller 170a among the controllers 170a to 170d of the image display apparatuses 100a to 100d may set the level of the luminance compensation value of the red sub-pixel to be lower than the level of the luminance compensation value of the green sub-pixel, when displaying the video on the first display 180a. Accordingly, it is possible to maximize the effect of reducing an afterimage of the green sub-pixel having a shorter device lifespan.

Meanwhile, the controllers 170a to 170d of the respective image display apparatuses 100a to 100d may perform temporal filtering on the luminance compensation value for each block during the second period and may display the video based on the filtered luminance compensation value for each block. Accordingly, smooth playback of a video may be achieved while reducing an afterimage on the video wall 10, on which the video is repeatedly displayed.

Meanwhile, the controllers 170a to 170d of the respective image display apparatuses 100a to 100d may turn off the temporal filtering at the time of scene change while the video is played back during the second period and may display a scene change image based on the luminance compensation value for each block. Accordingly, during the scene change, it is possible to focus more on the effect of reducing an afterimage than on smooth playback of the video.

Meanwhile, the controllers 170a to 170d of the respective image display apparatuses 100a to 100d may display a video having a luminance value higher than the luminance compensation value for each block during a third period following the second period. Accordingly, it is possible to reduce an afterimage on the video wall 10, on which the video is repeatedly displayed.

Meanwhile, the controller 170a of the first image display apparatus 100a, among the plurality of image display apparatuses 100a to 100d, may calculate a global gain based on the calculated accumulated luminance value for each block on the plurality of displays 180a to 180d, and may transmit the global gain to the respective controllers 170a to 170d corresponding to the plurality of displays 180a to 180d. Accordingly, it is possible to reduce an afterimage on the video wall 10, on which the video is repeatedly displayed.

Meanwhile, based on the luminance compensation value for each block and the global gain, the controller 170a to 170d of the respective image display apparatuses 100a to 100d may display a video during the second period following the first period when the video is repeatedly played back. Accordingly, it is possible to reduce an afterimage on the video wall 10, on which the video is repeatedly displayed.

Meanwhile, when the video is repeatedly played back, at least one controller among the plurality of image display apparatuses 100a to 100d may extract eigenvalues of each input frame, and may compare the extracted eigenvalues to determine whether a current input frame is repeated, and to determine a position of the repeated frame.

Figure 13A:
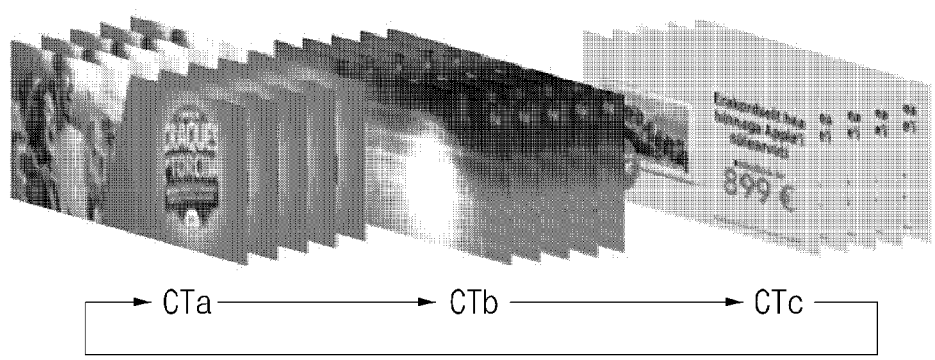
FIGS. 13A to 20 are diagrams referred to in the description of operation of FIG. 11.

FIG. 13A is a diagram illustrating a case where a video is repeatedly played back.

In the drawing, an example is illustrated in which a first content CTa, a second content CTb, and a third content CTc are sequentially and repeatedly played back.

In determination as to whether a video is repeated, when the first to third contents are repeated, it may be determined that the video is repeated, but the determination is not limited thereto, and various modifications may be made.

For example, when only the first content CTa as a single content is repeated, it may be determined that the video is repeated.

Figure 13B:
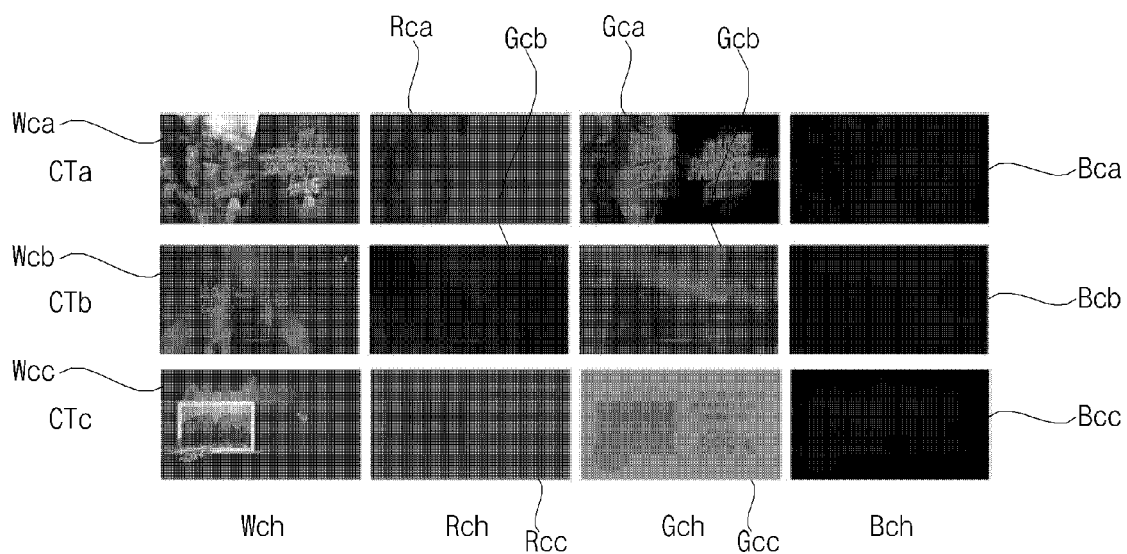

FIG. 13B is a diagram illustrating accumulation of luminance values for each sub-pixel of a display when the first content CTa, the second content CTb, and the third content CTc of FIG. 13A are sequentially played back.

Referring to the drawing, in the case where the display comprises an OLED panel having WRGB sub-pixels, when the first content CTa, the second content CTb, and the third content CTc are sequentially played, luminance values may be accumulated for each of a white (W) sub-pixel, a red (R) sub-pixel, a green (G) sub-pixel, and a blue (B) sub-pixel.

Further, luminance values may be accumulated for each of the white sub-pixel Wch, a red sub-pixel Rch, a green sub-pixel Gch, and a blue sub-pixel Bch and for each of the first content CTa, the second content CTb, and the third content CTc.

As for the first content CTa, an accumulated luminance value of the white sub-pixel, an accumulated luminance value of the red sub-pixel, an accumulated luminance value of the green sub-pixel, and an accumulated luminance value of the blue sub-pixel may be defined as Wca, Rca, Gca, and Bca.

As for the second content CTb, an accumulated luminance value of the white sub-pixel, an accumulated luminance value of the red sub-pixel, an accumulated luminance value of the green sub-pixel, and an accumulated luminance value of the blue sub-pixel may be defined as Wcb, Rcb, Gcb, and Bcb.

As for the third content CTc, an accumulated luminance value of the white sub-pixel, an accumulated luminance value of the red sub-pixel, an accumulated luminance value of the green sub-pixel, and an accumulated luminance value of the blue sub-pixel may be defined as Wcc, Rcc, Gcc, and Bcc.

The calculation of accumulated luminance values for each content and for each sub-pixel in FIG. 13B may be performed by the controller.

Meanwhile, in the case where the first content CTa, the second content CTb, and the third content CTc are displayed on the first to fourth image display apparatuses 100a to 100d in the video wall 10, the controllers 170a to 170d of the respective image display apparatuses 100a to 100d may calculate the accumulated luminance values for each sub-pixel and for each content of the video which is repeatedly played back.

Further, the controllers 170a to 170d of the respective image display apparatuses 100a to 100d may calculate a luminance compensation value for each block based on the calculated accumulated luminance value for each block.

For example, as the calculated accumulated luminance value for each block increases, the controllers 170a to 170d of the respective image display apparatuses 100a to 100d may decrease a level of the luminance compensation value for each block.

Meanwhile, the controllers 170a to 170d of the respective image display apparatuses 100a to 100d may set a level of the luminance compensation value of the red sub-pixel to be lower than a level of the luminance compensation value of the green sub-pixel. Accordingly, it is possible to maximize the effect of reducing an afterimage of the green sub-pixel having a shorter device lifespan.

Meanwhile, based on the calculated accumulated luminance value for each block, the controllers 170a to 170d of the respective image display apparatuses 100a to 100d may decrease a level of the luminance compensation value of a sub-pixel having a shorter device lifespan. Accordingly, by differently compensating for luminance for each of sub-pixels having different device lifespans, the effect of reducing an afterimage may be maximized. That is, it is possible to uniformly extend the lifespan of the respective sub-pixels.

Figure 14:
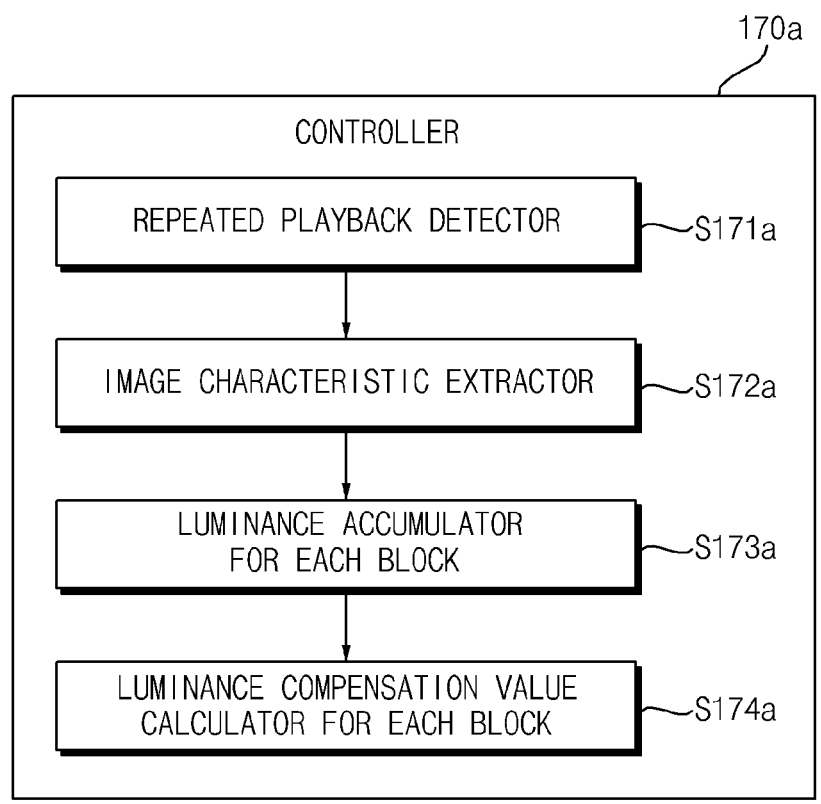

FIG. 14 is an example of an internal block diagram of the first controller 170a.

Referring to the drawing, the first controller 170a may include a repeated playback detector 171a, an image characteristic extractor 172a, a luminance accumulator 173a for each block, and a luminance compensation value calculator 174a for each block.

The repeated playback detector 171a may determine whether the displayed video is repeatedly played back.

For example, the repeated playback detector 171a may extract eigenvalues of each frame during playback of a video.

The eigenvalues of each frame may include information indicating positions of each frame, ID information of each frame, or the like.

Further, the repeated playback detector 171a may determine whether a group including the extracted eigenvalues is repeated.

Then, if the group including the extracted eigenvalues is repeated, the repeated playback detector 171a may determine which the corresponding group is repeated.

Meanwhile, upon determining that the displayed video is repeatedly played back, the repeated playback detector 171a may output repeated playback information.

The image characteristic extractor 172a may receive the repeated playback information from the repeated playback detector 171a and may extract characteristics of the repeatedly played video.

Particularly, the image characteristic extractor 172a may extract luminance values of the repeatedly played video.

Specifically, the image characteristic extractor 172a may extract luminance values of the repeatedly played video for each sub-pixel.

Meanwhile, in the case where the repeatedly played video contains a plurality of contents, the image characteristic extractor 172a may extract luminance values for each content and for each sub-pixel.

Then, the luminance accumulator 173a for each block may calculate an accumulated luminance value for each block on the plurality of displays 180a to 180d during the first period when the video is played back and displayed.

For example, the luminance accumulator 173a for each block may calculate the accumulated luminance value for each block on the plurality of displays 180a to 180d for each sub-pixel during the first period when the video is played back and displayed.

In another example, the luminance accumulator 173a for each block may calculate the accumulated luminance value for each block on the plurality of displays 180a to 180d for each content and for each sub-pixel during the first period when the video is played back and displayed.

Subsequently, the luminance compensation value calculator 174a for each block may calculate the luminance compensation value for each block based on the calculated accumulated luminance value for each block.

For example, based on the accumulated luminance value for each block which is calculated for each sub-pixel, the luminance compensation value calculator 174a for each block may calculate the luminance compensation value for each block and for each sub-pixel.

In another example, based on the accumulated luminance value for each block which is calculated for each content and for each sub-pixel, the luminance compensation value calculator 174a for each block may calculate the luminance compensation value for each block, for each content, and for each sub-pixel.

For example, as the calculated accumulated luminance value for each block increases, the luminance compensation value calculator 174a for each block may decrease a level of the luminance compensation value for each block. Accordingly, it is possible to efficiently reduce an afterimage on the video wall 10, on which the video is repeatedly displayed.

In another example, as the number of times of repeated playback of the video displayed on the plurality of image display apparatuses 100a to 100d increases, the luminance compensation value calculator 174a for each block may decrease a level of the luminance compensation value for each block. Accordingly, it is possible to efficiently reduce an afterimage on the video wall 10, on which the video is repeatedly displayed.

Meanwhile, the luminance compensation value calculator 174a for each block may set a level of the luminance compensation value of the red sub-pixel to be lower than a level of the luminance compensation value of the green sub-pixel. Accordingly, it is possible to maximize the effect of reducing an afterimage of the green sub-pixel having a shorter device lifespan.

Meanwhile, if the accumulated luminance value of the red sub-pixel is equal to that of the green sub-pixel, the luminance compensation value calculator 174a for each block may set a level of the luminance compensation value of the red sub-pixel to be lower than a level of the luminance compensation value of the green sub-pixel. Accordingly, it is possible to maximize the effect of reducing an afterimage of the green sub-pixel having a shorter device lifespan.

Accordingly, the controller 170a of the first image display apparatus 100a may play back the video during the second period, while reducing an afterimage based on the luminance compensation value for each block.

Similarly, the controllers 170a to 170d of the respective image display apparatuses 100a to 100d may play back the video during the second period based on the luminance compensation value for each block.

Figure 15:
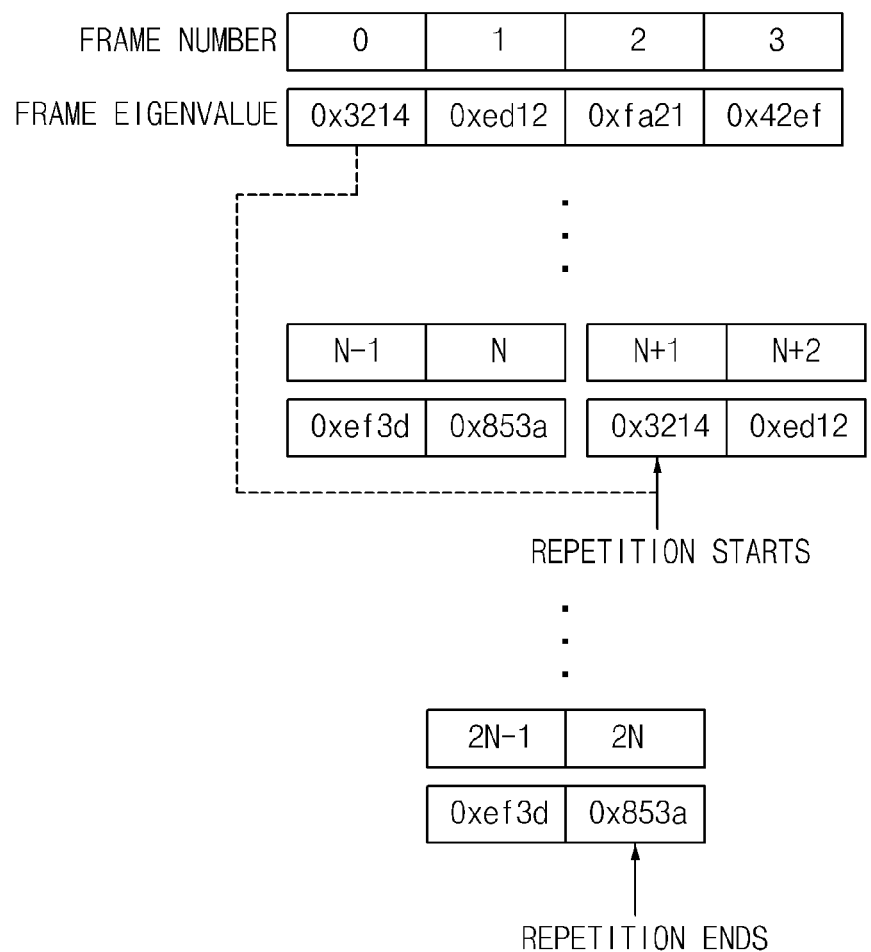

FIG. 15 is a diagram illustrating eigenvalues of each frame.

Referring to the drawing, the repeated playback detector 171a may extract eigenvalues of each frame during playback of a video.

In the drawing, an example is illustrated in which while the respective frames are numbered from 0 to 2N, the eigenvalues of the respective frames are arranged in the order of 0x3214, 0xed12, . . . , 0x853a, 0x3214, 0xed12, . . . , 0x853a, and the like.

The repeated playback detector 171a may identify frame numbers 0 and N+1 corresponding to the eigenvalue 0x3214 of the frame.

Further, the repeated playback detector 171a may identify frame numbers N and 2N corresponding to the eigenvalue 0x853a preceding the eigenvalue 0x3214.

Accordingly, the repeated playback detector 171a may identify, as one video, the frames numbered 0 to N corresponding to the eigenvalues from 0x3214 to 0x853a and may identify that the frames numbered N+1 to 2N are repeated again.

Figure 16:
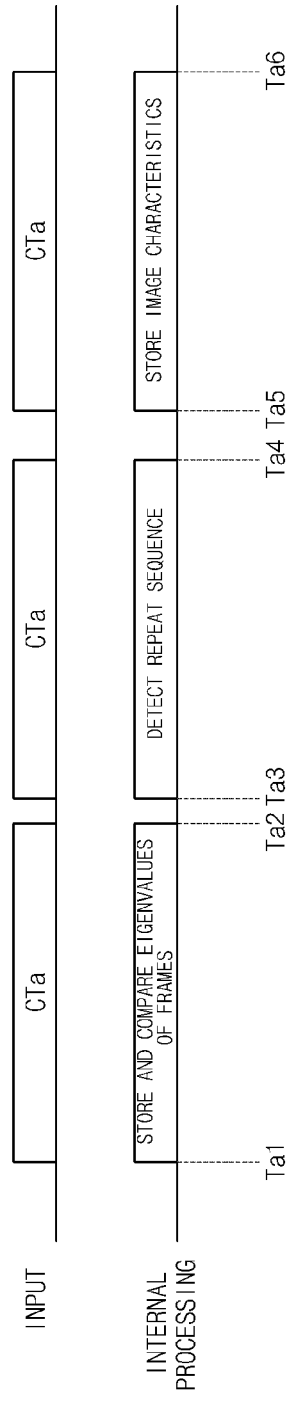

FIG. 16 is a diagram referred to in the description of an example of storing image characteristics during repeated playback of a video.

Referring to the drawing, in order to detect a video repeat sequence, the first controller 170a among the controllers 170a to 170d of the image display apparatuses 100a to 100d may extract and store eigenvalues of frames during a period of time from Ta1 to Ta2 when the first content CTa is played back.

Then, among the controllers 170a to 170d of the image display apparatuses 100a to 100d, the first controller 170a may detect a repeat sequence during a period from Ta3 to Ta4 when the first content CTa is played again. Particularly, the first controller 170a may detect the repeat sequence by extracting and comparing the stored eigenvalues of the frames and the extracted eigenvalues of the frames.

Subsequently, among the controllers 170a to 170d of the image display apparatuses 100a to 100d, the first controller 170a may store image characteristics during a period of time from Ta5 to Ta6, when the first content CTa is played over again.

For example, the first controller 170a may store luminance values of a video to be displayed on the first display 180a.

Specifically, if the first display 180a comprises an OLED panel having WRGB sub-pixels, the first controller 170a may store luminance values for each of the white (W) sub-pixel, the red (R) sub-pixel, the green (G) sub-pixel, and the blue (B) sub-pixel, and may accumulate the luminance values.

Figure 17:
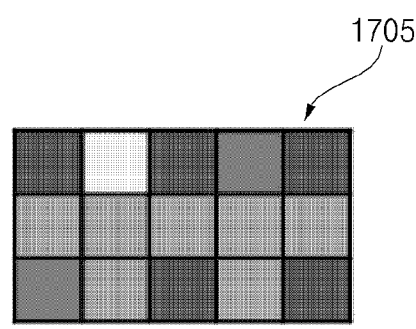

FIG. 17 is a diagram illustrating an accumulated luminance value of 5*3 blocks 1705.

As illustrated herein, an accumulated luminance value may vary for each block.

Meanwhile, the first controller 170a may calculate an average accumulated luminance value for each block.

Alternatively, the first controller 170a may calculate a maximum accumulated luminance value for each block.

Further, the first controller 170a may calculate a luminance compensation value based on the calculated accumulated luminance value for each block.

Figure 18:
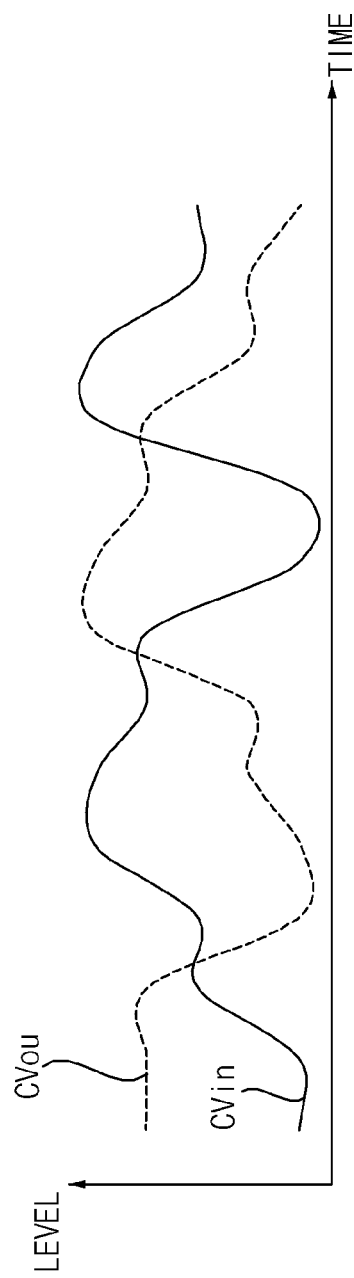

FIG. 18 is a diagram illustrating a luminance compensation level according to a luminance level of an input image.

Referring to the drawing, in the case where a luminance curve of an input image for each frame is formed as CVin, the controller may calculate a luminance compensation level curve, such as CVou, which is inversely proportional thereto, in order to compensate for CVin.

That is, as the calculated accumulated luminance value for each block increases, the controller may decrease a level of the luminance compensation value for each block. Accordingly, it is possible to efficiently reduce an afterimage on the video wall 10, on which the video is repeatedly displayed.

Meanwhile, the video wall 10 according to an embodiment of the present disclosure may perform temporal filtering on the luminance compensation value for each block during the second period and may display a video based on the filtered luminance compensation value, which will be described below with reference to FIG. 19.

Figure 19:
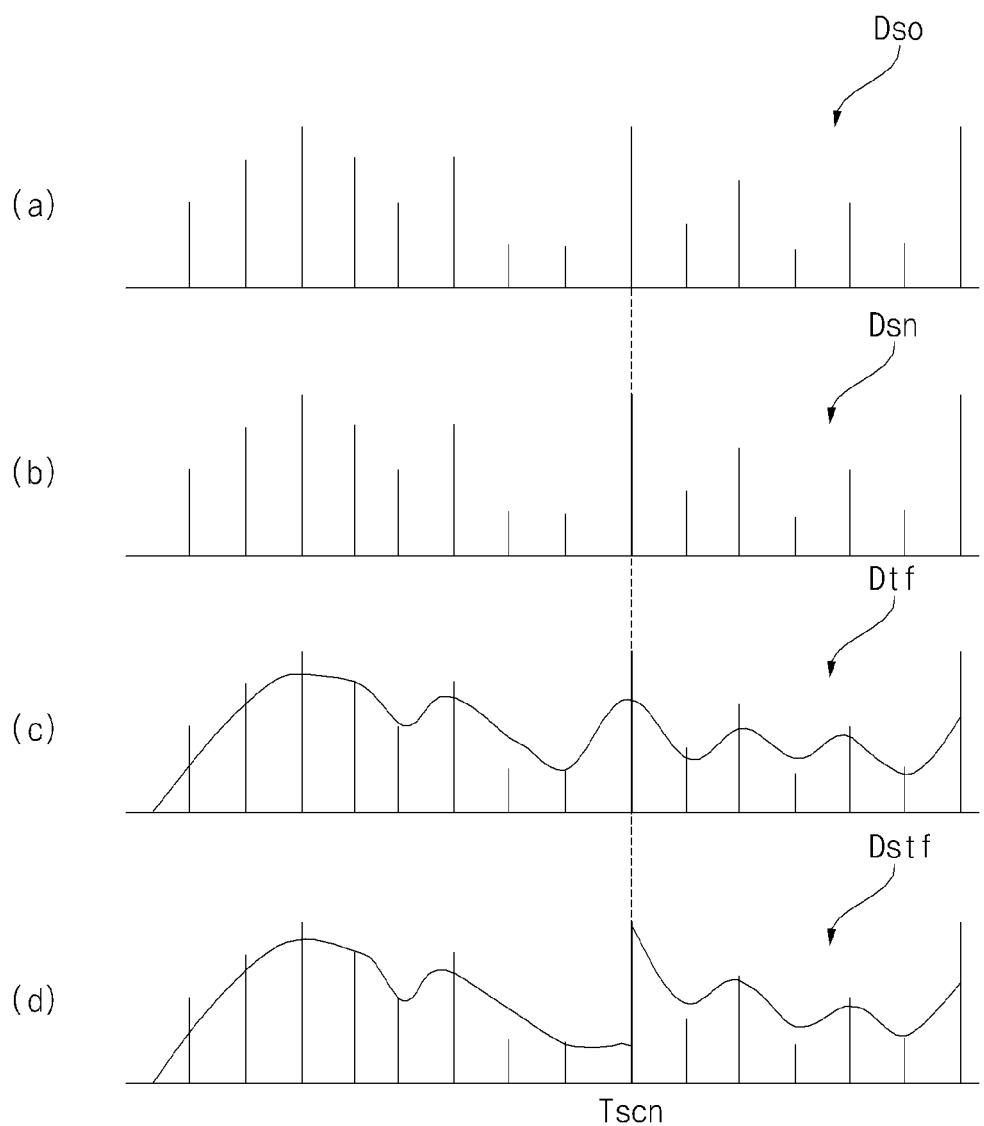

In FIG. 19, (a) illustrates a luminance change histogram Dso of a repeatedly played video, to which a luminance compensation value for each block is applied.

FIG. 19(b) illustrates a luminance change histogram DsN of a video, to which a luminance compensation value for each block is applied, when a scene change occurs in an input image at a time point Tscn.

FIG. 19(c) illustrates a graph Dtf obtained by performing temporal filtering on the video to which the luminance compensation value for each block is applied.

The video wall 10 according to an embodiment of the present disclosure performs temporal filtering on the luminance compensation value for each block during the second period and may display a video based on the filtered luminance compensation value Dtf for each block. Accordingly, smooth playback of the video may be achieved while reducing an afterimage on the video wall 10, on which the video is repeatedly displayed.

In FIG. 19, (d) illustrates a graph Dstf obtained when the temporal filtering is turned off at the time point Tscn.

The video wall 10 according to an embodiment of the present disclosure turns off the temporal filtering at the time of scene change Tscn while the video is played back during the second period and may display a scene change image based on the luminance compensation value for each block. Accordingly, during the scene change, it is possible to focus more on the effect of reducing an afterimage than on smooth playback of the video.

Figure 20:
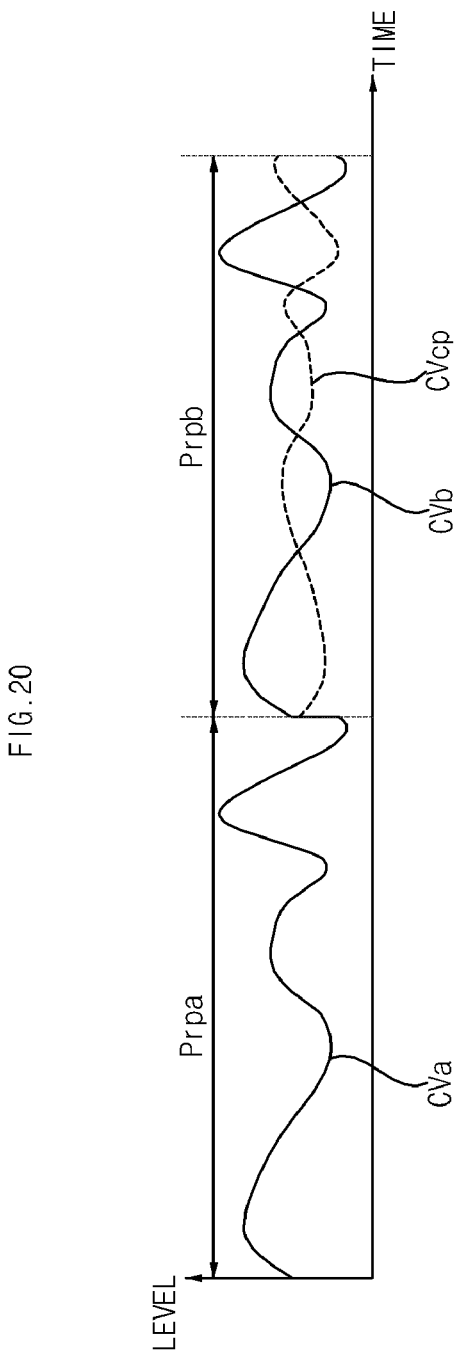

FIG. 20 is a diagram illustrating an example in which an accumulated luminance value for each block is calculated during a first period Prpa, and a video having varied luminance is displayed during a second period Prpb following the first period Prpa, according to the luminance compensation value for each block which is calculated based on the accumulated luminance value for each block.

In the drawing, an example is illustrated in which a luminance curve during the first period Prpa is CVa, a luminance curve during the second period Prpb is CVb, and a luminance compensation curve is CVcp.

That is, by playing back and displaying the video according to the luminance compensation curve CVcp during the second period Prpb, an afterimage may be reduced on the video wall 10.

Figure 21:
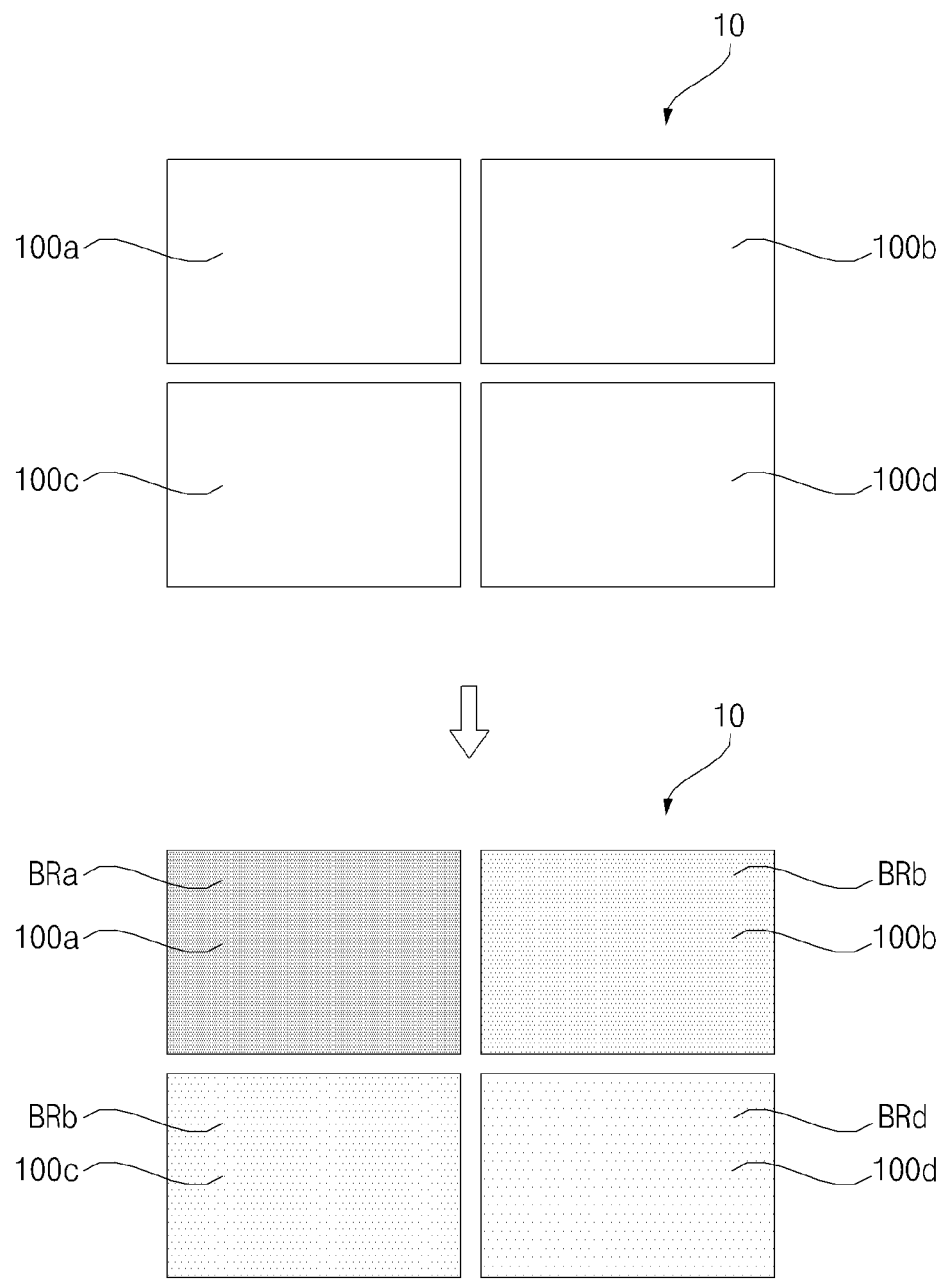
FIG. 21 is a diagram illustrating a luminance difference in the case where an afterimage reduction method is performed for each image display apparatus in a video wall.

FIG. 21 is a diagram illustrating a luminance difference in the case where an afterimage reduction method is performed for the respective image display apparatuses 100a to 100d in the video wall 10.

Referring to the drawing, when the afterimage reduction method is performed for the respective image display apparatuses 100a to 100d, luminance values of images displayed on the plurality of image display apparatuses 100a to 100d are divided into BRa, BRb, BRc, and BRd. In this case, a problem may occur in that visibility on the video wall 10 may be reduced due to the luminance difference.

In order to make up for the problem, the present disclosure provides a method of calculating a global gain, which will be described below with reference to FIG. 22 and the following figures.

Figure 22:
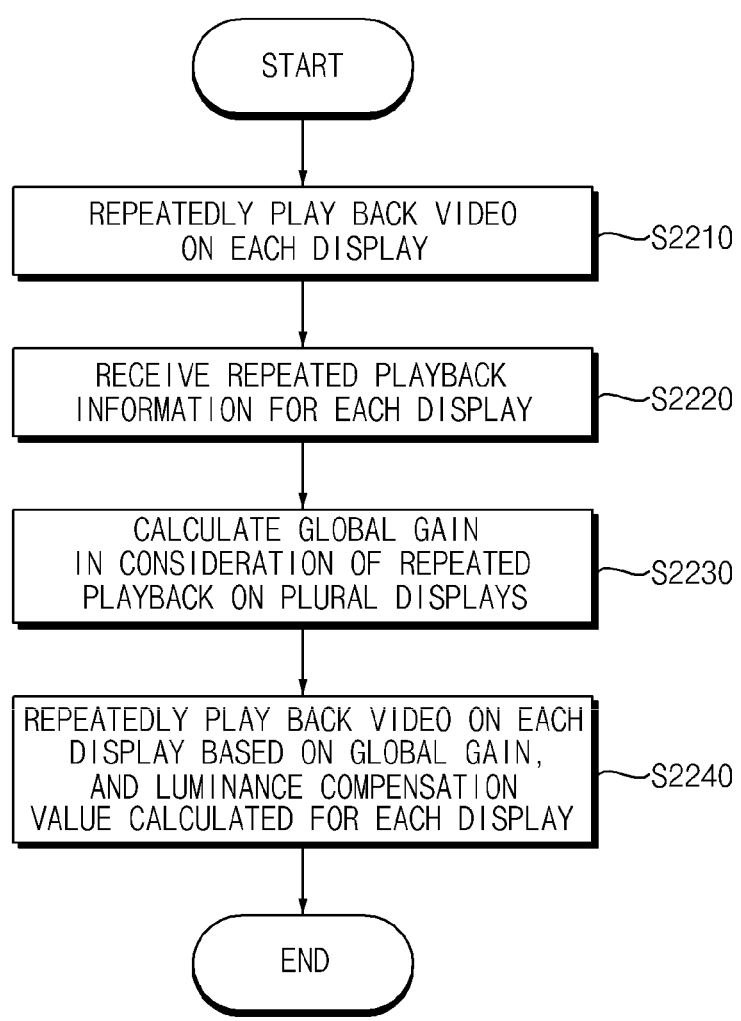
FIG. 22 is a flowchart illustrating an operating method of a video wall according to another embodiment of the present disclosure.
Figure 23A:
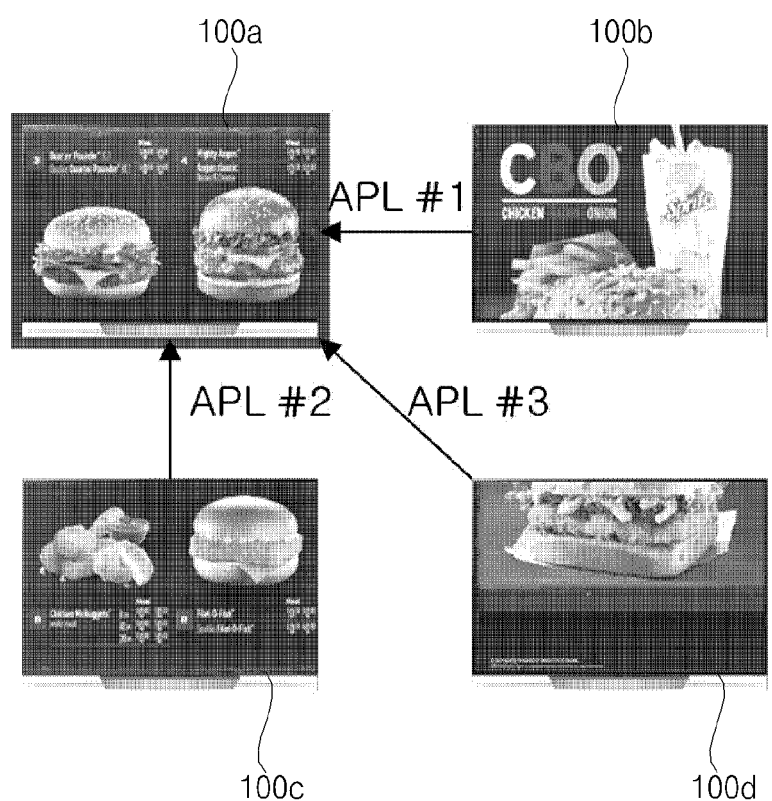
FIGS. 23A to 23C are diagrams referred to in the description of operation of FIG. 22.
Figure 23B:
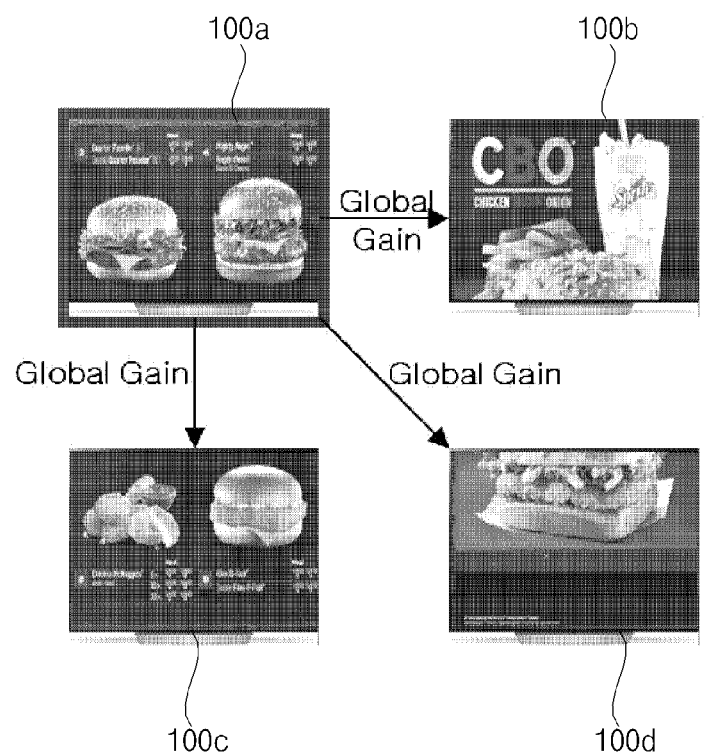
Figure 23C:
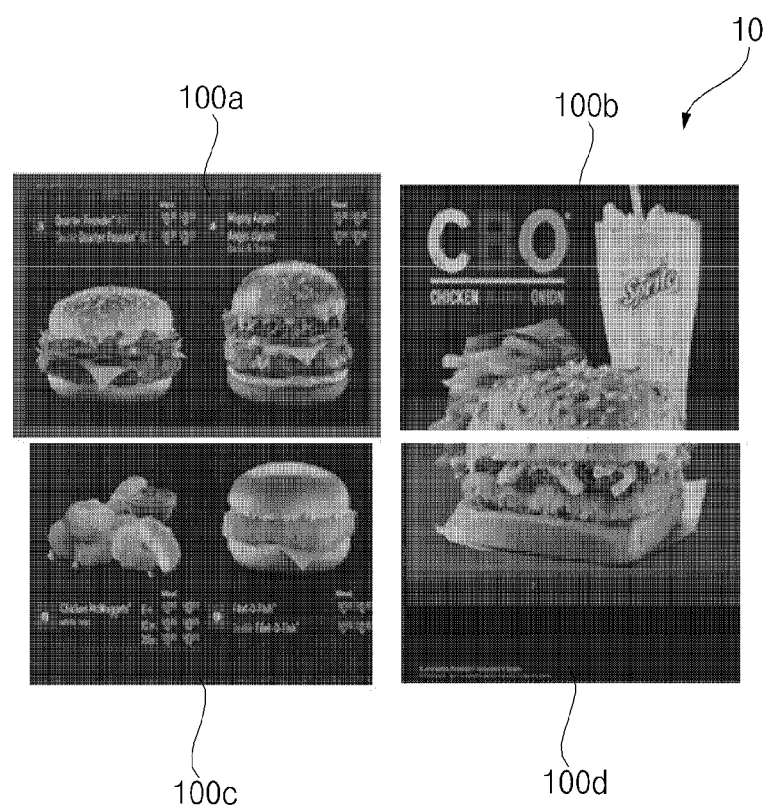

FIG. 22 is a flowchart illustrating an operating method of a video wall according to another embodiment of the present disclosure, and FIGS. 23A to 23C are diagrams referred to in the description of operation of FIG. 22.

First, referring to FIG. 22, the plurality of image display apparatuses 100a to 100d in the video wall 10 may display an input video on the plurality of displays 180a to 180d.

To this end, the image divider 160 may divide the input video into a plurality of videos and may transmit the divided plurality of videos to the respective image display apparatuses 100a to 100d.

Meanwhile, the video wall 10 may repeatedly play back the video on the respective image display apparatuses 100a to 100d (S2210).

In this case, the first controller 170a in the first image display apparatus 100a determines whether the displayed video is repeatedly played back.

For example, the first controller 170a in the first image display apparatus 100a may extract eigenvalues of each frame during playback of the video as illustrated in FIG. 12.

The eigenvalues of each frame may include information indicating positions of each frame, ID information of each frame, or the like.

Further, the first controller 170a in the first image display apparatus 100a may determine whether a group including the extracted eigenvalues is repeated. In this case, the group may correspond to a sequence.

Then, if the group including the extracted eigenvalues is repeated, the first controller 170a in the first image display apparatus 100a may determine which the corresponding group is repeated.

Subsequently, upon determining that the displayed video is repeatedly played back, the first controller 170a in the first image display apparatus 100a may transmit repeated playback information to the controllers 170a to 170d of the respective image display apparatuses 100a to 100d.

Accordingly, the controllers 170a to 170d of the respective image display apparatuses 100a to 100d may receive the repeated playback information (S2220).

Accordingly, during playback of the video, the controllers 170a to 170d of the respective image display apparatuses 100a to 100d may calculate an accumulated luminance value for each block on the plurality of displays 180a to 180d during the first period when the video is repeatedly played back.

Further, based on the calculated accumulated luminance value for each block, the controllers 170a to 170d of the respective image display apparatuses 100a to 100d may calculate a luminance compensation value for each block.

Meanwhile, the controllers 170a to 170d of the respective image display apparatuses 100a to 100d may transmit, along with ID information of each image display apparatus, the calculated accumulated luminance value for each block or the luminance compensation value for each block to the first controller 170a in the first image display apparatus 100a, as illustrated in FIG. 23A.

FIG. 23A illustrates an example in which the second to fourth image display apparatuses 100b to 100d respectively transmit luminance values APL1 to APL3 to the first image display apparatus 100a.

Accordingly, the first controller 170a in the first image display apparatus 100a may calculate a global gain based on the accumulated luminance value or the luminance compensation value which is received from the respective image display apparatuses 100a to 100d (S2230).

In addition, the first controller 170a in the first image display apparatus 100a may transmit the calculated global gain to the controllers 170a to 170d of the respective image display apparatuses 100a to 100d, as illustrated in FIG. 23B.

FIG. 23B illustrates an example in which the first image display apparatus 100a transmits the global gain to the second to fourth image display apparatuses 100b to 100d.

Accordingly, the controllers 170a to 170d of the respective image display apparatuses 100a to 100d may play back the video based on the calculated global gain and the calculated luminance compensation value for each block, as illustrated in FIG. 23C (S2240).

Accordingly, a luminance difference between the respective image display apparatuses 100a to 100d as illustrated in FIG. 21 may be reduced.

That is, as illustrated in FIG. 23C, the luminance difference between the respective image display apparatuses 100a to 100d in the video wall 10 may be reduced, and a video may be repeatedly played back with a reduced afterimage.

While the present disclosure has been particularly shown and described with reference to preferred embodiments thereof, it will be understood by those skilled in the art that the present disclosure is not limited to those exemplary embodiments and various changes in form and details may be made therein without departing from the scope and spirit of the invention as defined by the appended claims and should not be individually understood from the technical spirit or prospect of the present disclosure.

What is claimed is:

1. A video wall comprising:
a plurality of displays arranged adjacent to each other;
an image divider configured to divide an input image into a plurality of images for displaying on the plurality of displays; and
at least one controller configured to control a plurality of image display apparatuses corresponding to the plurality of displays,
wherein in response to a video including a plurality of frames having varied luminance being repeatedly played back on the plurality of image display apparatuses, the at least one controller is configured to extract a luminance value of each sub-pixel of the repeatedly played video during a first period of a repeated playback period, calculate an accumulated luminance value based on the extracted luminance value during the first period, and calculate a luminance compensation value based on the calculated accumulated luminance value during the first period, and the plurality of displays display the video based on the luminance compensation value during a second period following the first period,
wherein the luminance compensation value is inversely proportional to the varied luminance of the plurality of frames.

2. The video wall of claim 1, wherein among the plurality of image display apparatuses, a controller of a first image display apparatus is configured to determine whether the video displayed on the plurality of image display apparatuses is repeatedly played back, and
in response to the video including the plurality of frames having varied luminance being repeatedly played back on the plurality of image display apparatuses, the controller is configured to extract the luminance value of each sub-pixel of the repeatedly played video during the first period of the repeated playback period, calculate the accumulated luminance value based on the extracted luminance value during the first period, and calculate the luminance compensation value based on the calculated accumulated luminance value, and the controller displays the video based on the luminance compensation value during the second period following the first period when the video is repeatedly played back.

3. The video wall of claim 1, wherein among the plurality of image display apparatuses, a controller of a first image display apparatus is configured to determine whether the video displayed on the plurality of image display apparatuses is repeatedly played back, wherein in response to the video including the plurality of frames having varied luminance being repeatedly played back on the plurality of image display apparatuses, controllers of the respective image display apparatuses are configured to extract the luminance value of each sub-pixel of the repeatedly played video during the first period of the repeated playback period, calculate the accumulated luminance value based on the extracted luminance value during the first period, and calculate the luminance compensation value based on the calculated accumulated luminance value, and the controllers display the video based on the luminance compensation value during the second period following the first period.

4. The video wall of claim 1, wherein among the plurality of image display apparatuses, a controller of a first image display apparatus, during playback of the video, is configured to extract eigenvalues of each frame and determine whether a sequence including a plurality of the extracted eigenvalues is repeated, and in response to the sequence being repeated, the controller is configured to determine that the video is repeatedly played back.

5. The video wall of claim 1, wherein as the calculated accumulated luminance value increases, a level of the luminance compensation value decreases.

6. The video wall of claim 1, wherein as a number of times of repeated playback of the video displayed on the plurality of image display apparatuses increases, the level of the luminance compensation value.

7. The video wall of claim 1, wherein the plurality of displays comprise an OLED panel, wherein a level of a luminance compensation value of a red sub-pixel of a first display, among the plurality of displays, is lower than a level of a luminance compensation value of a green sub-pixel.

8. The video wall of claim 1, wherein the plurality of displays comprise an OLED panel, wherein in response to an accumulated luminance value of the red sub-pixel of the first display, among the plurality of displays, being equal to an accumulated luminance value of the green sub-pixel, the level of the luminance compensation value of the red sub-pixel is lower than the level of the luminance compensation value of the green sub-pixel.

9. The video wall of claim 1, wherein during the second period, the at least one controller is configured to perform temporal filtering on the luminance compensation value, and the plurality of displays display the video based on the filtered luminance compensation value.

10. The video wall of claim 9, wherein the at least one controller is configured to turn off the temporal filtering at a time of scene change while the video is repeatedly played back during the second period, and the plurality of displays display a scene change image based on the luminance compensation value.

11. The video wall of claim 1, wherein while the video is played back, the plurality of displays display a video having a luminance value higher than the luminance compensation value during a third period following the second period.

12. The video wall of claim 1, wherein among the plurality of image display apparatuses, a controller of a first image display apparatus is configured to:

calculate a common compensation luminance value based on the calculated accumulated luminance value; and transmit the common compensation luminance value to the respective controllers corresponding to the plurality of displays.

13. The video wall of claim 1, wherein:

in response to the video including the plurality of frames having varied luminance being repeatedly played back on the plurality of image display apparatuses, the at least one controller is configured to extract the luminance value of each sub-pixel of the repeatedly played video during the first period of the repeated playback period, calculate the accumulated luminance value based on the extracted luminance value during the first period, and calculate a common compensation luminance value based on the calculated accumulated luminance value; and during the second period following the first period when the video is repeatedly played back, the plurality of displays display the video based on the luminance compensation value and the common compensation luminance value.

14. A video wall comprising:

a plurality of displays arranged adjacent to each other;

an image divider configured to divide an input image into a plurality of images for displaying on the plurality of displays; and at least one controller configured to control a plurality of image display apparatuses corresponding to the plurality of displays, wherein in response to a video including a plurality of frames having varied luminance being repeatedly played back on the plurality of image display apparatuses, the at least one controller is configured to extract a luminance value of each sub-pixel of the repeatedly played video during a first period of a repeated playback period, calculate an accumulated luminance value based on the extracted luminance value during the first period, and calculate a common compensation luminance value based on the calculated accumulated luminance value, and based on the common compensation luminance value, the plurality of displays display the video during a second period following the first period when the video is repeatedly played back, wherein a luminance compensation value is inversely proportional to the varied luminance of the plurality of frames.

15. The video wall of claim 14, wherein in response to the video including the plurality of frames having varied luminance being repeatedly played back on the plurality of image display apparatuses, the at least one controller is configured to extract the luminance value of each sub-pixel of the repeatedly played video during the first period of the repeated playback period, calculate the accumulated luminance value based on the extracted luminance value during the first period, and calculate a common compensation luminance value based on the calculated accumulated luminance value; and during the second period following the first period when the video is repeatedly played back, the plurality of displays display the video based on the luminance compensation value and the common compensation luminance value.

16. The video wall of claim 14, wherein among the plurality of image display apparatuses, a controller of a first image display apparatus is configured to determine whether the video displayed on the plurality of image display apparatuses is repeatedly played back, and in response to the plurality of frames having varied luminance being repeatedly played back, the controller of the first image display apparatus is configured to extract the luminance value of each sub-pixel of the repeatedly played video during the first period of the repeated playback period, calculate the accumulated luminance value based on the extracted luminance value during the first period, and calculate a common compensation luminance value based on the calculated accumulated luminance value, and based on the common compensation luminance value, the controller displays the video during the second period following the first period.

17. The video wall of claim 14, wherein among the plurality of image display apparatuses, a controller of a first image display apparatus is configured to determine whether the video displayed on the plurality of image display apparatuses is repeatedly played back, wherein in response to the video including the plurality of frames having varied luminance being repeatedly played back on the plurality of image display apparatuses, controllers of the respective image display apparatuses are configured to calculate the accumulated luminance value, wherein among the plurality of image display apparatuses, the controller of the first image display apparatus is configured to calculate a common compensation luminance value based on the calculated accumulated luminance value, wherein in response to the video including the plurality of frames having varied luminance being repeatedly played back on the plurality of image display apparatuses, the controllers of the respective image display apparatuses display the video during the second period following the first period based on the common compensation luminance value.

18. The video wall of claim 14, wherein among the plurality of image display apparatuses, a controller of a first image display apparatus, during playback of the video, is configured to extract eigenvalues of each frame and determines whether a sequence including a plurality of the extracted eigenvalues is repeated, and in response to the sequence being repeated, the controller is configured to determine that the video is repeatedly played back.

* * * * *